(12) United States Patent
Fujiwara

(10) Patent No.: US 11,172,072 B2
(45) Date of Patent: Nov. 9, 2021

(54) RECORDING APPARATUS AND RECORDING METHOD

(71) Applicant: CANON KABUSHIKI KAISHA, Tokyo (JP)

(72) Inventor: Izumi Fujiwara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/937,405

(22) Filed: Jul. 23, 2020

(65) Prior Publication Data
US 2021/0037145 A1 Feb. 4, 2021

(30) Foreign Application Priority Data

Jul. 31, 2019 (JP) .............................. JP2019-141565

(51) Int. Cl.
*H04N 1/00* (2006.01)
*B41J 11/00* (2006.01)
*B41J 29/13* (2006.01)
*G06F 3/12* (2006.01)

(52) U.S. Cl.
CPC ........ *H04N 1/00034* (2013.01); *B41J 11/003* (2013.01); *B41J 29/13* (2013.01); *H04N 1/0009* (2013.01); *H04N 1/0071* (2013.01); *H04N 1/00087* (2013.01); *H04N 1/00551* (2013.01);
(Continued)

(58) Field of Classification Search
CPC ............ B65H 2220/03; B65H 2220/01; B65H 2511/10; B65H 2511/12; B65H 2511/20; B65H 1/02; B65H 1/04; B65H 1/266; B65H 2402/45; B65H 2405/115; B65H 2405/324; B65H 2511/417; B65H 2511/51; B41J 11/003; B41J 13/0018; B41J 29/13; B41J 29/38; H04N 1/00034; H04N 1/00087; H04N 1/0009; H04N 1/00551; H04N 1/00655; H04N 1/00891; H04N 1/00002; H04N 1/00037; H04N 1/00084; H04N 1/00708; H04N 1/0071; H04N 1/00681;
(Continued)

(56) References Cited

U.S. PATENT DOCUMENTS 10,498,913 B2 * 12/2019 Ishida ................ H04N 1/00602
2006/0072139 A1 4/2006 Hult
(Continued)

*Primary Examiner* — Chad Dickerson
(74) *Attorney, Agent, or Firm* — Canon U.S.A., Inc. I.P. Division

(57) ABSTRACT

A recording apparatus includes a recording head, a loading unit, a feeding unit, a cover, a detection unit, and a determination unit. The feeding unit feeds a recording medium loaded on the loading unit to a recording position where the recording head performs the recording. The cover moves between an opening state and a closing state. The determination unit determines a size of the loaded recording medium based on a result of a width detection operation. The recording head records an image per a determination result. If the cover closing is detected before the recording is performed, the determination unit performs the width detection operation to determine the recording medium size loaded on the loading unit. If the cover opening is detected and the recording apparatus receives a recording instruction, the determination unit performs the width detection operation to determine the recording medium size loaded on the loading unit.

21 Claims, 21 Drawing Sheets

(52) U.S. Cl.
CPC ..... *H04N 1/00655* (2013.01); *H04N 1/00763* (2013.01); *H04N 1/00891* (2013.01)

(58) Field of Classification Search
CPC ........... H04N 1/32667; H04N 1/00763; H04N 1/00814; H04N 1/32539
USPC ......... 358/1.5, 1.9, 2.1, 1.11–1.18; 399/8, 9, 399/23, 376, 114, 380; 347/3
See application file for complete search history.

(56) References Cited

U.S. PATENT DOCUMENTS

| | | | |
|---|---|---|---|
| 2010/0066782 A1* | 3/2010 | Yamamoto | B41J 29/38 |
| | | | 347/16 |
| 2015/0181062 A1* | 6/2015 | Takahata | H04N 1/00551 |
| | | | 358/498 |
| 2016/0150109 A1* | 5/2016 | Matsui | H04N 1/00737 |
| | | | 358/1.13 |
| 2016/0198062 A1* | 7/2016 | Peng | H04N 1/2034 |
| | | | 358/496 |
| 2017/0185878 A1* | 6/2017 | Matsuo | H04N 1/00496 |

* cited by examiner

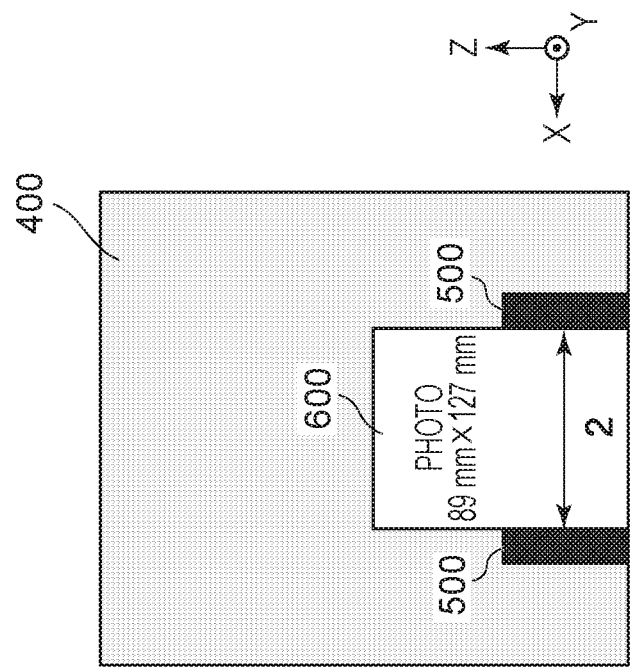
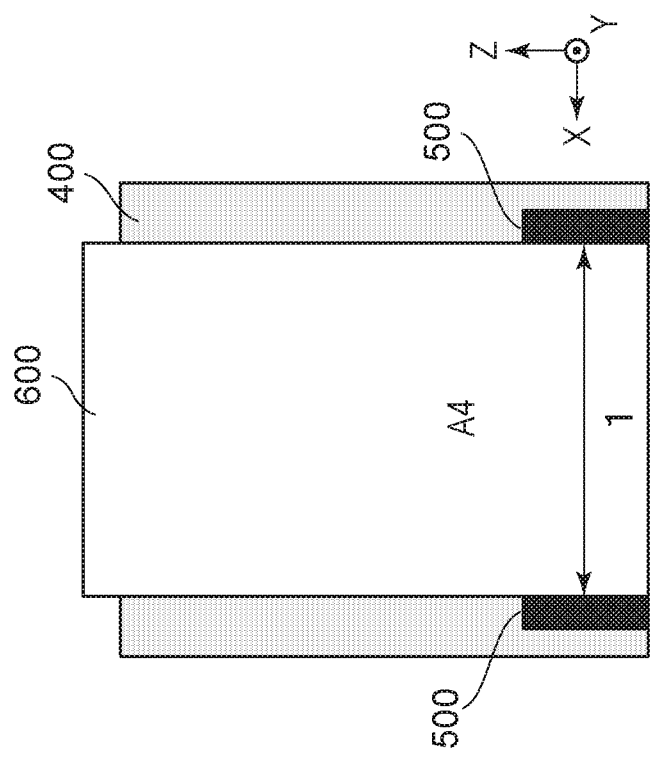

FIG. 8

| FEEDING TRAY | | | SENSOR THRESHOLD VALUE | | PAPER TEMPLATE | REMARKS |
|---|---|---|---|---|---|---|
| PAPER SIZE GROUP | MINIMUM WIDTH SIZE (NOT SMALLER THAN) [mm] | MAXIMUM WIDTH SIZE (SMALLER THAN) [mm] | MAXIMUM AD VALUE (LOWER THAN <) | MINIMUM AD VALUE (NOT LOWER THAN ≥) | NAME | OVERLAPPING |
| 1 | – | 70 | 1024 | 880 | NAME CARD (Card) | NOT-OVERLAPPED |
| 2 | 70 | 90 | 880 | 770 | PHOTO (89 mm × 127 mm) | NOT-OVERLAPPED |
| | | | | | PHOTO SQUARE (89 mm) | |
| | | | | | ENVELOPE (90 mm × 205 mm) VERTICAL | OVERLAPPED |
| | | | | | ENVELOPE (190 mm × 98 mm) VERTICAL | |
| 3 | 90 | 110 | 770 | 650 | ENVELOPE (90 mm × 205 mm) VERTICAL | OVERLAPPED |
| | | | | | ENVELOPE (190 mm × 98 mm) VERTICAL | |
| | | | | | POSTCARD | NOT-OVERLAPPED |
| | | | | | PHOTO SQUARE (4×4) | |
| | | | | | PHOTO 4×6 (102 mm × 152 mm) | |
| | | | | | #10 ENVELOPE VERTICAL | |
| | | | | | ENVELOPE (235 mm × 105 mm) VERTICAL | |
| | | | | | DL ENVELOPE VERTICAL | OVERLAPPED |
| | | | | | ENVELOPE (120 mm × 235 mm) VERTICAL | |
| 4 | 110 | 140 | 650 | 480 | DL ENVELOPE VERTICAL | OVERLAPPED |
| | | | | | ENVELOPE (120 mm × 235 mm) VERTICAL | |
| | | | | | PHOTO (127 mm × 178 mm) | NOT-OVERLAPPED |
| | | | | | 5 × 7 | |
| | | | | | PHOTO SQUARE (127 mm) | |
| 5 | 140 | 160 | 480 | 370 | A5 | NOT-OVERLAPPED |
| 6 | 160 | 200 | 370 | 140 | 7 × 10 | NOT-OVERLAPPED |
| | | | | | B5 | |
| 7 | 200 | – | 140 | 0 | RETURN POSTCARD | NOT-OVERLAPPED |
| | | | | | PHOTO 203 mm × 254 mm (8 × 10) | |
| | | | | | A4 | |
| | | | | | A4 (ART PAPER MARGIN 35 mm) | |
| | | | | | Letter | |
| | | | | | LETTER (ART PAPER MARGIN 35 mm) | |
| | | | | | Legal | |

FIG. 9

| STORAGE INFORMATION ||| DATA |
|---|---|---|---|
| LOADING PLACE | CLASSIFICATION | ITEM | |
| FEEDING TRAY | LOADED PAPER INFORMATION | PAPER SIZE | A4 |
| | | PAPER TYPE | PLAIN PAPER |
| | | PAPER SIZE GROUP | GROUP 7 |
| | GROUP HISTORY INFORMATION | GROUP 1 PAPER SIZE | NAME CARD |
| | | GROUP 1 PAPER TYPE | PLAIN PAPER |
| | | GROUP 2 PAPER SIZE | PHOTO 89 mm × 127 mm |
| | | GROUP 2 PAPER TYPE | GLOSSY PAPER |
| | | GROUP 3 PAPER SIZE | 4×6 |
| | | GROUP 3 PAPER TYPE | GLOSSY PAPER |
| | | GROUP 4 PAPER SIZE | 5×7 |
| | | GROUP 4 PAPER TYPE | GLOSSY PAPER |
| | | GROUP 5 PAPER SIZE | A5 |
| | | GROUP 5 PAPER TYPE | PLAIN PAPER |
| | | GROUP 6 PAPER SIZE | B5 |
| | | GROUP 6 PAPER TYPE | PLAIN PAPER |
| | | GROUP 7 PAPER SIZE | A4 |
| | | GROUP 7 PAPER TYPE | PLAIN PAPER |
| | CONTROL FLAG INFORMATION | INCONSISTENCY DETECTION FLAG | ON |
| | | PAPER WIDTH DETECTION FLAG | ON |

FIG. 12A

Feeding tray is set as follows:
OK?

Paper size    4×6
Paper type    Glossy paper

[Update]    [Yes]

FIG. 12B

Registration of paper information

Set

Paper size    Postcard
              4×6
              Photo square 4×4

Paper type

FIG. 12C

Registration of paper information

Set

Paper size    Plain paper
              Glossy paper
              Matte photo

Paper type

FIG. 12D

Feeding tray is set as follows:
OK?

Paper size    Postcard
Paper type    Glossy paper

[Update]    [Yes]

FIG. 12E

Setting feeding tray information...

FIG. 13A

| LOADING PLACE | STORAGE INFORMATION | | |
|---|---|---|---|
| | CLASSIFICATION | ITEM | DATA |
| FEEDING TRAY | LOADED PAPER INFORMATION | PAPER SIZE | 4×6 |
| | | PAPER TYPE | GLOSSY PAPER |
| | | PAPER SIZE GROUP | GROUP 3 |
| | GROUP HISTORY INFORMATION | GROUP 1 PAPER SIZE | NAME CARD |
| | | GROUP 1 PAPER TYPE | PLAIN PAPER |
| | | GROUP 2 PAPER SIZE | PHOTO 89 mm × 127 mm |
| | | GROUP 2 PAPER TYPE | GLOSSY PAPER |
| | | GROUP 3 PAPER SIZE | 4×6 |
| | | GROUP 3 PAPER TYPE | GLOSSY PAPER |
| | | GROUP 4 PAPER SIZE | 5×7 |
| | | GROUP 4 PAPER TYPE | GLOSSY PAPER |
| | | GROUP 5 PAPER SIZE | A5 |
| | | GROUP 5 PAPER TYPE | PLAIN PAPER |
| | | GROUP 6 PAPER SIZE | B5 |
| | | GROUP 6 PAPER TYPE | PLAIN PAPER |
| | | GROUP 7 PAPER SIZE | A4 |
| | | GROUP 7 PAPER TYPE | PLAIN PAPER |
| | CONTROL FLAG INFORMATION | INCONSISTENCY DETECTION FLAG | ON |
| | | PAPER WIDTH DETECTION FLAG | ON |

FIG. 13B

| LOADING PLACE | STORAGE INFORMATION | | |
|---|---|---|---|
| | CLASSIFICATION | ITEM | DATA |
| FEEDING TRAY | LOADED PAPER INFORMATION | PAPER SIZE | POSTCARD |
| | | PAPER TYPE | GLOSSY PAPER |
| | | PAPER SIZE GROUP | GROUP 3 |
| | GROUP HISTORY INFORMATION | GROUP 1 PAPER SIZE | NAME CARD |
| | | GROUP 1 PAPER TYPE | PLAIN PAPER |
| | | GROUP 2 PAPER SIZE | PHOTO 89 mm × 127 mm |
| | | GROUP 2 PAPER TYPE | GLOSSY PAPER |
| | | GROUP 3 PAPER SIZE | POSTCARD |
| | | GROUP 3 PAPER TYPE | GLOSSY PAPER |
| | | GROUP 4 PAPER SIZE | 5×7 |
| | | GROUP 4 PAPER TYPE | GLOSSY PAPER |
| | | GROUP 5 PAPER SIZE | A5 |
| | | GROUP 5 PAPER TYPE | PLAIN PAPER |
| | | GROUP 6 PAPER SIZE | B5 |
| | | GROUP 6 PAPER TYPE | PLAIN PAPER |
| | | GROUP 7 PAPER SIZE | A4 |
| | | GROUP 7 PAPER TYPE | PLAIN PAPER |
| | CONTROL FLAG INFORMATION | INCONSISTENCY DETECTION FLAG | ON |
| | | PAPER WIDTH DETECTION FLAG | ON |

FIG. 16A

Following paper is not set
in feeding tray

Paper size    A4
Paper type    Plain paper

Next

FIG. 16B

Open cover to set paper
and close cover

FIG. 21A

User setting paper is not set in feeding tray

Set paper having smaller width

[ Next ]

FIG. 21B

User setting paper is not set in feeding tray

Set paper having greater width

[ Next ]

FIG. 21C

Open cover to set paper and close cover

RECORDING APPARATUS AND RECORDING METHOD

BACKGROUND

Field

The present disclosure relates to a recording apparatus including a printing unit and a recording method.

Description of the Related Art

A recording apparatus is known which includes a feeding port through which paper is fed from the back face of the recording apparatus and a cover for protecting input of an external element, such as dust, from the feeding port into the recording apparatus. The recording apparatus further includes a sensor for detecting opening and closing of the cover.

In addition, U.S. Patent No. 2006/0072139 discloses a method of determining the size of paper loaded in a loading unit from the result of detection by a sensor. The sensor acquires the position of a side guide for positioning of the paper loaded in the loading unit.

SUMMARY

When the method of determining the size of paper disclosed in U.S. Patent No. 2006/0072139 is adopted in the above-described apparatus including the sensor that detects opening and closing of the cover and the determination of the paper size is performed using closing of the cover as a trigger, the inventors have found the following matter. A user opens a feeding cover to load the paper, positions the side guide, and closes the feeding cover to complete paper exchange. The apparatus is capable of automatically determining the paper size by detecting the position of the side guide when the feeding cover is closed. However, if the user forgets to close the cover, there is no timing to detect the position of the side guide and, thus, it is not possible to determine the paper size. As a result, since a recording operation is performed without determining the paper size, the recording condition may not be appropriate for the paper to cause a lack of user-friendliness.

The present disclosure is provided to improve the user-friendliness, which is concerned in the determination of the paper size.

According to an aspect of the present disclosure, a recording apparatus includes a recording head configured to perform recording of an image on a recording medium based on a recording instruction, a loading unit configured to be loaded with the recording medium, a feeding unit configured to feed the recording medium loaded on the loading unit to a position where the recording head is capable of performing the recording, a cover configured to be movable between an opening state in which a feeding port for loading the recording medium on the loading unit is opened and a closing state in which at least part of the feeding port is covered, an opening-closing detection unit configured to detect an opening-closing state of the cover, and a determination unit configured to determine a size of the recording medium loaded on the loading unit based on a result of detection by a width detection operation configured to detect a width of the recording medium loaded on the loading unit, wherein the recording by the recording head is performed in accordance with a result of determination by the determination unit, wherein, if the opening-closing detection unit detects the closing of the cover before the recording is performed, the determination unit performs the width detection operation to determine the recording medium size loaded on the loading unit, and wherein, if the opening-closing detection unit detects the opening of the cover and the recording apparatus receives the recording instruction, the determination unit performs the width detection operation to determine the recording medium size loaded on the loading unit.

Further features of the present disclosure will become apparent from the following description of exemplary embodiments with reference to the attached drawings.

BRIEF DESCRIPTION OF THE DRAWINGS

FIG. 7A and FIG. 7B are diagrams illustrating the relationship between the position of a paper guide and the loaded paper in the first embodiment.

FIG. 8 is a table indicating the relationship between the values output from a paper guide sensor and paper size groups in the first embodiment.

FIG. 9 is a table indicating paper information held in a ROM in the first embodiment.

FIG. 12A to FIG. 12E illustrate notification screens in the first embodiment.

FIG. 13A and FIG. 13B are tables illustrating the paper information when the cover is closed in the first embodiment.

FIG. 16A and FIG. 16B illustrate notification screens in the first embodiment.

FIG. 21A to FIG. 21C illustrate notification screens in the third embodiment.

DESCRIPTION OF THE EMBODIMENTS

Figure 1:
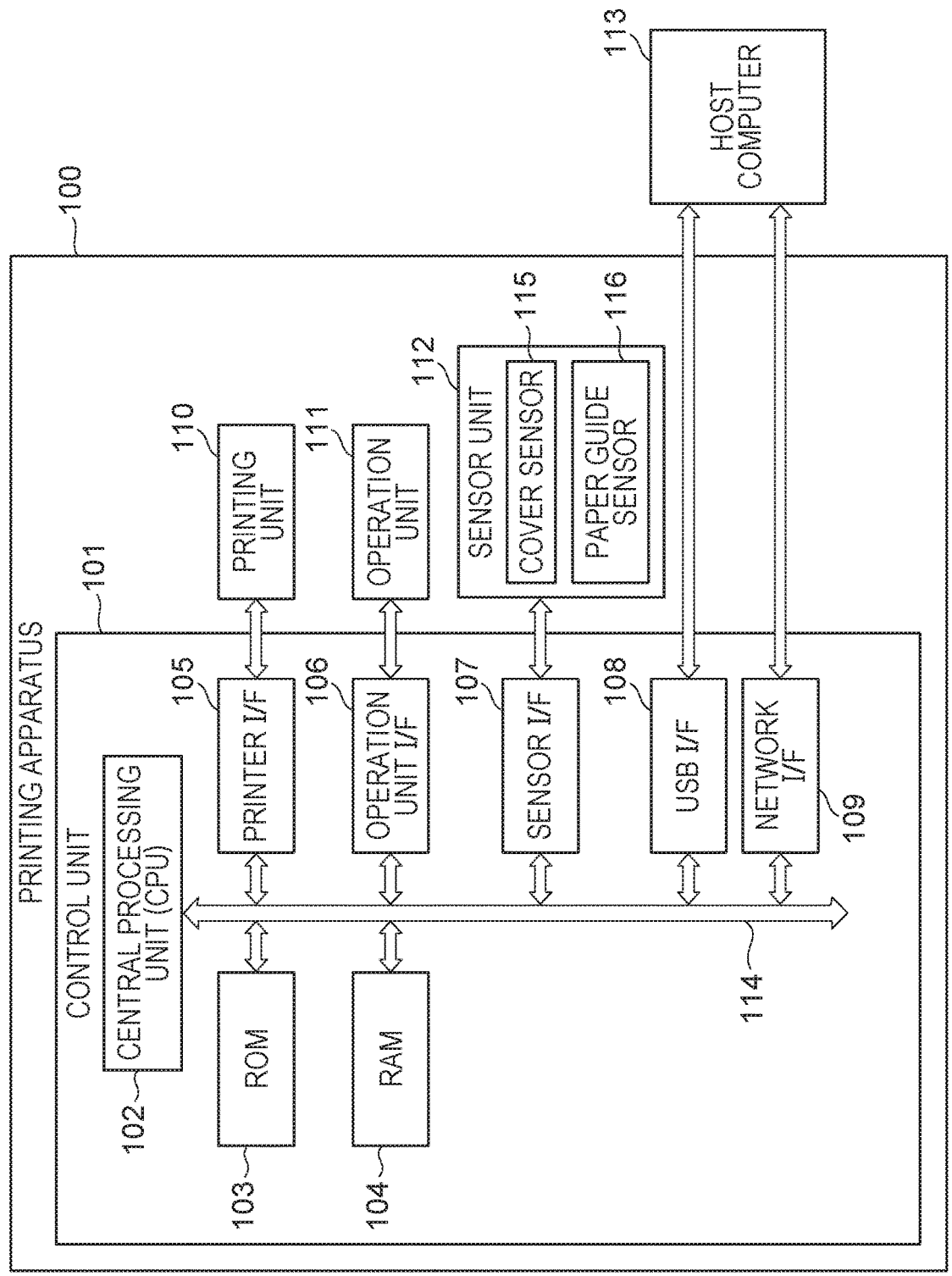
FIG. 1 is a block diagram illustrating an example of the hardware configuration of a printing apparatus according to a first embodiment.

Embodiments of the present disclosure will herein be described in detail with reference to the drawings. The same reference numerals are used to identify the portions that have been described and a duplicated description of such portions is omitted herein. The contents of components described in the embodiments, the relative arrangement of the components, and so on are not intended to limit the scope of the present disclosure to them unless specific description is given.

First Embodiment

FIG. 1 is a block diagram illustrating an example of the hardware configuration of a printing apparatus 100 in a first embodiment. The printing apparatus 100 decomposes a control program stored in a read only memory (ROM) 103 into a random access memory (RAM) 104 with a central processing unit (CPU) 102 in a control unit 101 and reads out the control program, if needed, to perform a variety of control including turning-on control of power, recording control, and processing of image data as an image processing unit. In addition, the printing apparatus 100 performs interruption control, such as timer interruption. The ROM 103 stores the image data, various programs, setting information used for the variety of control, settings of the main body, which are set by a user, and so on. The RAM 104 is a main memory of the CPU 102 and is used as a temporary storage area in which the various programs stored in the ROM 103 are decomposed. In addition, part of control information used by the control unit 101 for the control is held in the RAM 104. Although a flash storage or the like is supposed as the ROM 103 in the first embodiment, an auxiliary storage unit, such as a hard disk, may be used as the ROM 103. Although one CPU 102 uses one RAM 104 to perform the respective processes illustrated flowcharts described below in the printing apparatus 100, another mode may be adopted. For example, the respective processes illustrated the flowcharts described below may be performed through cooperation of multiple CPUs, multiple ROMs, multiple RAMs, and multiple storages. Part of the processes may be performed using one or more hardware circuits. A printing unit 110 is connected to the control unit 101 with a printer interface (I/F) 105. The image data to be recorded in the printing unit 110 is transferred from the control unit 101 through the printer I/F 105 and an image is recorded on paper in the printing unit 110. Although the recording medium on which the image is recorded is not limited to the paper and film paper or the like may be used, the term "paper" is used in the first embodiment. An operation unit 111 is connected to the control unit 101 with an operation unit I/F 106. A sensor unit 112 is connected to the control unit 101 with a sensor I/F 107. The sensor unit 112 includes a cover sensor 115 and a paper guide sensor 116. The cover sensor 115 is an opening-closing detection sensor that detects opening and closing of a cover 402 (refer to FIG. 4) described below in response to an operation by the user. The paper guide sensor 116 is a guide detection sensor that detects the position of a paper guide 500 (refer to FIG. 5). A USB I/F 108 and a network I/F 109 control communication with a host computer 113 connected to the printing apparatus 100. The components 102 to 109 described above are connected to each other via a system bus 114 managed by the CPU 102.

Figure 2:
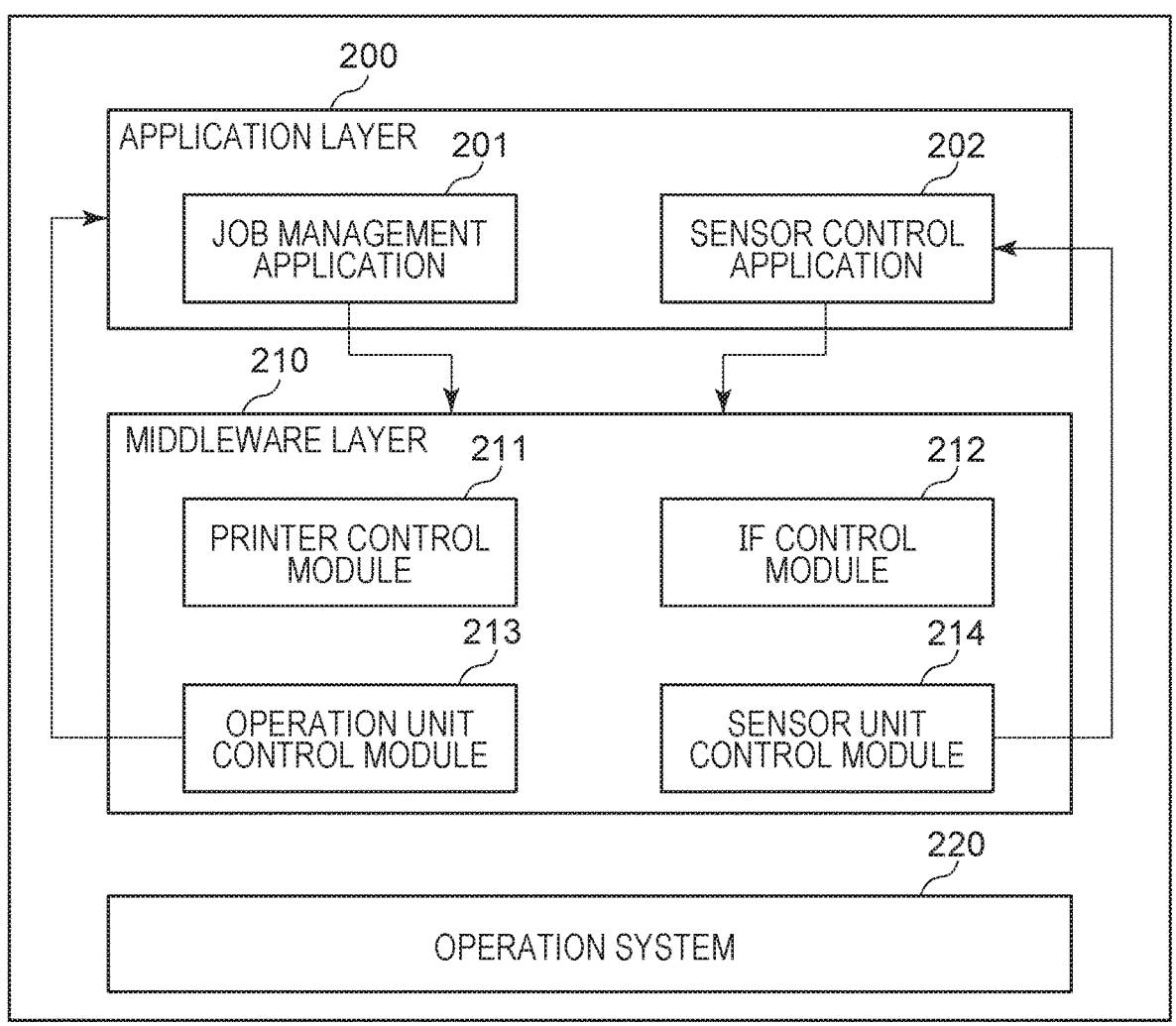
FIG. 2 is a block diagram illustrating an example of the software configuration of the printing apparatus according to the first embodiment.

FIG. 2 is a block diagram illustrating an example of the software configuration of the control program for controlling each hardware module in the embodiments of the present disclosure. As described above, the control program is stored in the ROM 103 and decomposed in the RAM 104. The CPU 102 executes the control program decomposed in the RAM 104 to control the printing unit 110 and the sensor unit 112 illustrated in FIG. 1. The control program is roughly divided into three blocks. The three blocks include an application layer 200 that manages applications, a middleware layer 210 for controlling the apparatus via the various I/Fs, and an operation system 220 that manages control of the entire printing apparatus 100.

The role of each block will now be described. The operation system 220 provides a basic function for executing the control program in the CPU 102. The middleware layer 210 is composed of a software group that controls the I/Fs between a printer and the respective physical devices. In the first embodiment, the middleware layer 210 includes a printer control module 211 as a module that controls the printer I/F 105. In addition, the middleware layer 210 includes an IF control module 212 and an operation unit control module 213. The IF control module 212 controls the USB I/F 108 and the network I/F 109, which are devices used for the communication with the host computer 113. The operation unit control module 213 controls the operation unit I/F 106. The middleware layer 210 further includes a sensor unit control module 214 that controls the sensor I/F 107, which is a detection unit for the various sensors provided in the printing apparatus 100. The application layer 200 realizes a recording function and so on provided by the printing apparatus 100 to the user by operating the respective devices via the corresponding modules in the middleware layer 210. For example, upon detection of a recording instruction to instruct a recording operation from the user by the operation unit control module 213 through the operation unit 111 and the operation unit I/F 106, the application layer 200 is notified of the detection of the recording instruction. The application layer 200 performs printing with a job management application 201, which receives the recording instruction and performs the recording. The job management application 201 performs the recording operation with the printing unit 110 using the printer control module 211 in the middleware layer 210. The sensor unit control module 214 periodically monitors the state of the sensor unit 112. If the sensor unit control module 214 detects that the state of the sensor unit 112 is changed, the sensor unit control module 214 notifies a sensor control application 202 in the application layer 200 of the change of the state of the sensor unit 112. The sensor control application 202 determines the mounting-removal state and the opening-closing state of each component from the state of each sensor. The sensor control application 202 controls the contents to be displayed in the operation unit 111 via the operation unit control module 213 and the operation of the printing unit 110 via the printer control module 211, if needed.

Figure 3:
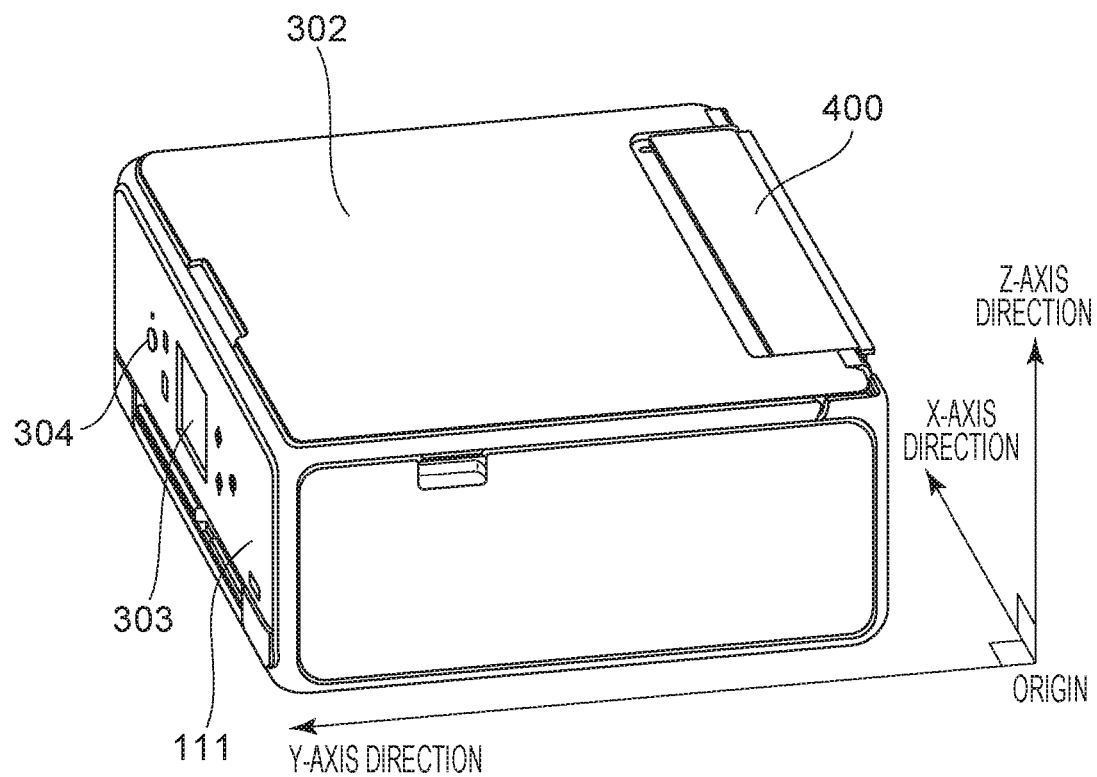
FIG. 3 is an external perspective view of the printing apparatus according to the first embodiment.

FIG. 3 is an external perspective view of the printing apparatus 100 in the first embodiment. The printing apparatus (hereinafter also referred to as the apparatus) 100 includes the operation unit 111, a scanner unit 302, the printing unit (not illustrated), and the control unit 101. The printing unit is provided in a housing of the apparatus 100 and includes a recording head that discharges ink to perform the recording on the paper and rollers for conveying the paper. The control unit 101 is a control circuit board provided in the housing of the printing apparatus 100. The user operates the printing apparatus 100 from a direction opposed to the operation unit 111 when the user uses the printing apparatus 100. In this specification, in the apparatus installed in the usage environment, the side of the origin of the Y axis is defined as a far side and the positive-direction side along the Y-axis direction is defined as a near side. The origin of the Z axis is defined as a lower portion and the positive direction along the Z-axis direction is defined as an upper direction. The operation unit 111 is provided at the near side of the scanner unit 302. An indicator 303, such as a liquid crystal display (LCD) and a light emitting diode (LED), and multiple input keys 304 are provided on the operation unit 111. The input keys 304 include a color copy start key, a monochrome copy start key, a stop key, arrow keys, a power button, and so on. The input keys 304 may not be switch (SW) type keys and the indicator 303 may be a touch panel. In this case, the user touches the indicator 303 to perform the same inputs as the operations with the input keys 304. The panel of the operation unit 111 is configured so that the amount of tilt of the panel is capable of being adjusted steplessly, such as a process without steps, in accordance with the preference of the user in order to improve the visibility and the operability of the user who operates the panel. The CPU 102 controls the notification of information on the indicator 303 in the first embodiment. The indicator and the input keys may be provided with a speaker and a microphone and audio notification or audio input of information may be made to the user. A paper discharge tray is provided at the rear side (at the negative direction side in the Y-axis direction) of the panel of the operation unit 111. The paper discharge tray is capable of being pulled out by tilting the panel and is used in the state in which the paper discharge tray is pulled out. A feeding tray 400 is provided at the far side (at the back face side) of the printing apparatus 100 and is used with being pulled out.

How the paper is set in the feeding tray 400 provided at the far side of a recording apparatus will now be described with reference to FIG. 4 to FIG. 7A and FIG. 7B.

Figure 4:
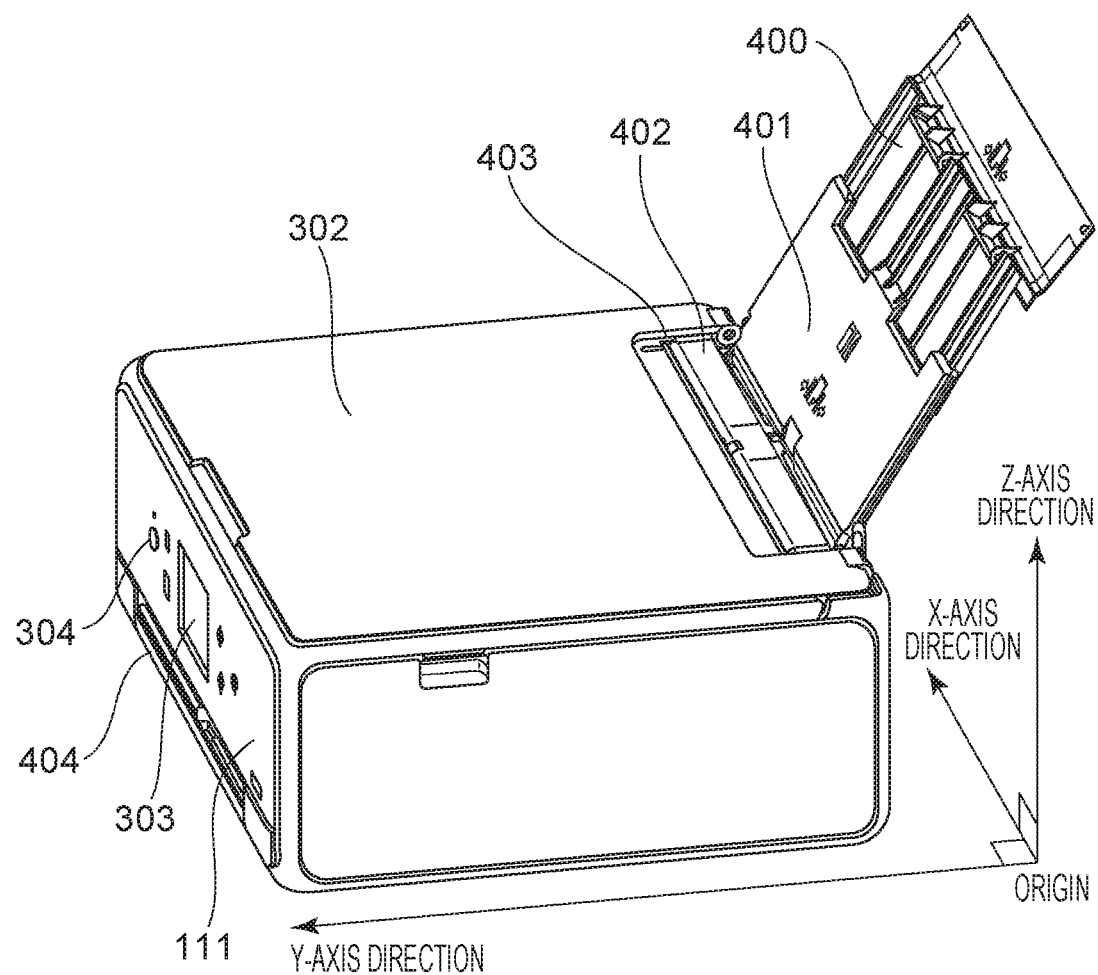
FIG. 4 is an external perspective view of the printing apparatus in a state in which a feeding tray is pulled out in the first embodiment.

FIG. 4 is an external perspective view of the printing apparatus 100 and illustrates the state in which the feeding tray 400 is pulled out. A loading face 401 is a member on which the paper is loaded. The paper loaded on the loading face 401 is fed into the inside of the printing apparatus 100 through a feeding port 405 (refer to FIG. 5) provided in the printing apparatus 100 and the recording is performed on the paper by the printing unit. The cover 402 for covering the feeding port 405 is provided below the loading face 401 of the feeding tray 400 so as to be openable and closable. The cover 402 is provided so as to prevent dirt, such as dust, from entering the printing apparatus 100 through the feeding port 405 or to prevent the user from putting his/her hand in the feeding port 405. It is sufficient for the cover 402 to cover part of the feeding port 405 to an extent in which the above function is achieved. The cover 402 pivotally moves around a support shaft 403, which is a rotating shaft (the center of the pivotal movement), provided in the scanner unit 302. The support shaft 403 is provided at the near side of the printing apparatus 100, compared with the feeding port 405, and the cover 402 opens and closes for the feeding port 405. In the state in FIG. 4, the cover 402 is closed and the feeding port 405 is covered with the cover 402. Accordingly, the paper is not capable of being loaded in the feeding tray 400. The printing apparatus 100 is provided with a cassette 404, in addition to the feeding tray 400. The cassette 404 is capable of being pulled out from the printing apparatus 100 by the user, who pulls out the cassette 404 toward the near side, and the paper is capable of being loaded in the cassette 404 in the state in which the cassette 404 is pulled out. After the paper is loaded, pushing the cassette 404 into the printing apparatus 100 enables the cassette 404 to be mounted in the printing apparatus 100 again.

Figure 5:
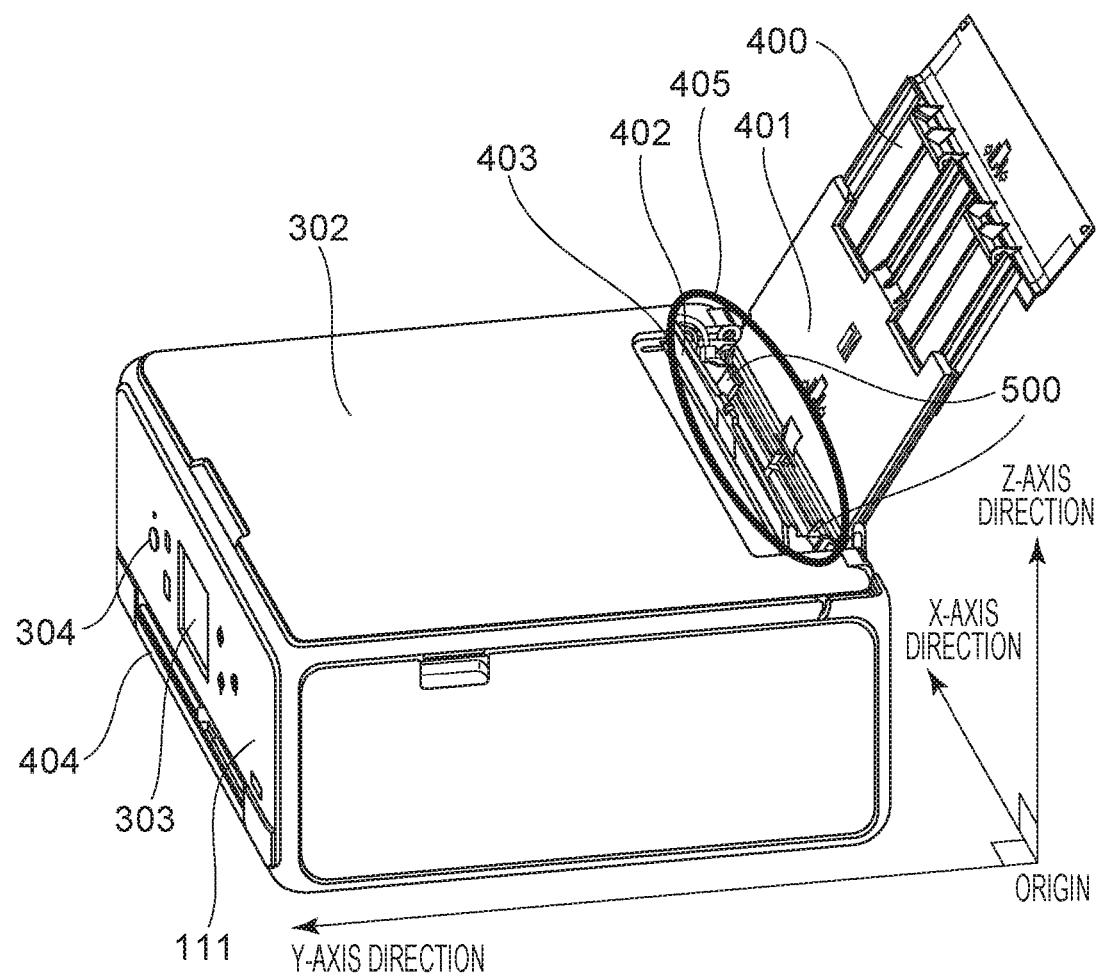
FIG. 5 is an external perspective view of the printing apparatus in a state in which a cover is opened in the first embodiment.

FIG. 5 is an external perspective view in the loading of the paper in the feeding tray 400. The user is capable of confirming the feeding port 405, which is covered with the cover 402, by opening the cover 402. The paper is capable of being loaded in the feeding tray 400 in the state in FIG. 5. The paper is set in the feeding tray 400 in a state in which the leading end (the bottom end) of the paper is inserted into the feeding port 405. The paper guide 500 is a side guide that abuts against the paper loaded in the feeding tray 400 in the width direction of the paper (the X-axis direction) to suppress movement of the paper in the width direction of the paper. In the first embodiment, the paper guide 500 is movable in the width direction of the paper and restricts the position of the paper loaded in the feeding tray 400 with respect to the center of the feeding port 405 in the X-axis direction. The reference position in the width direction of the paper may be set to the right end or the left end of the main body and the position of the paper may be restricted at a position toward one side of the feeding port 405. When the position of the paper is not restricted with the paper guide 500, the paper is liable to be greatly shifted in its width direction or be tilted when the paper is fed. If the shift or the tilt occurs, the possibility of not performing the recording intended or predetermined by the user on the paper is increased. Accordingly, it is necessary for the user to move the paper guide 500 to a position where the paper is capable of being fixed when the paper is loaded in the feeding tray 400. The cover sensor 115 (refer to FIG. 1) is mounted on the cover 402 as an opening-closing detection unit that detects the opening-closing state of the cover 402. The CPU 102 is capable of detecting the opening-closing state of the cover 402 by acquiring a sensor value of the cover sensor 115 via the sensor I/F 107. Although a toggle switch (SW) that reacts in response to the opening or closing of the cover 402 is supposed as the cover sensor 115 in the first embodiment, an optical sensor may be used as the cover sensor 115 and the configuration of the sensor is not limited. The paper guide sensor 116 (refer to FIG. 1) is mounted on the paper guide 500. The CPU 102 is capable of detecting the position of the paper guide 500 by acquiring an AD value that varies with the resistance value, which is varied depending on the position of the paper guide sensor 116, via the sensor I/F 107. The AD value is increased with the decreasing distance between the paper guide 500 and the center of the feeding tray 400 in the first embodiment. Although the paper guide sensor 116 is described as a resistance type sensor in the first embodiment, for example, multiple optical sensors may be used to detect the paper size.

Figure 6:
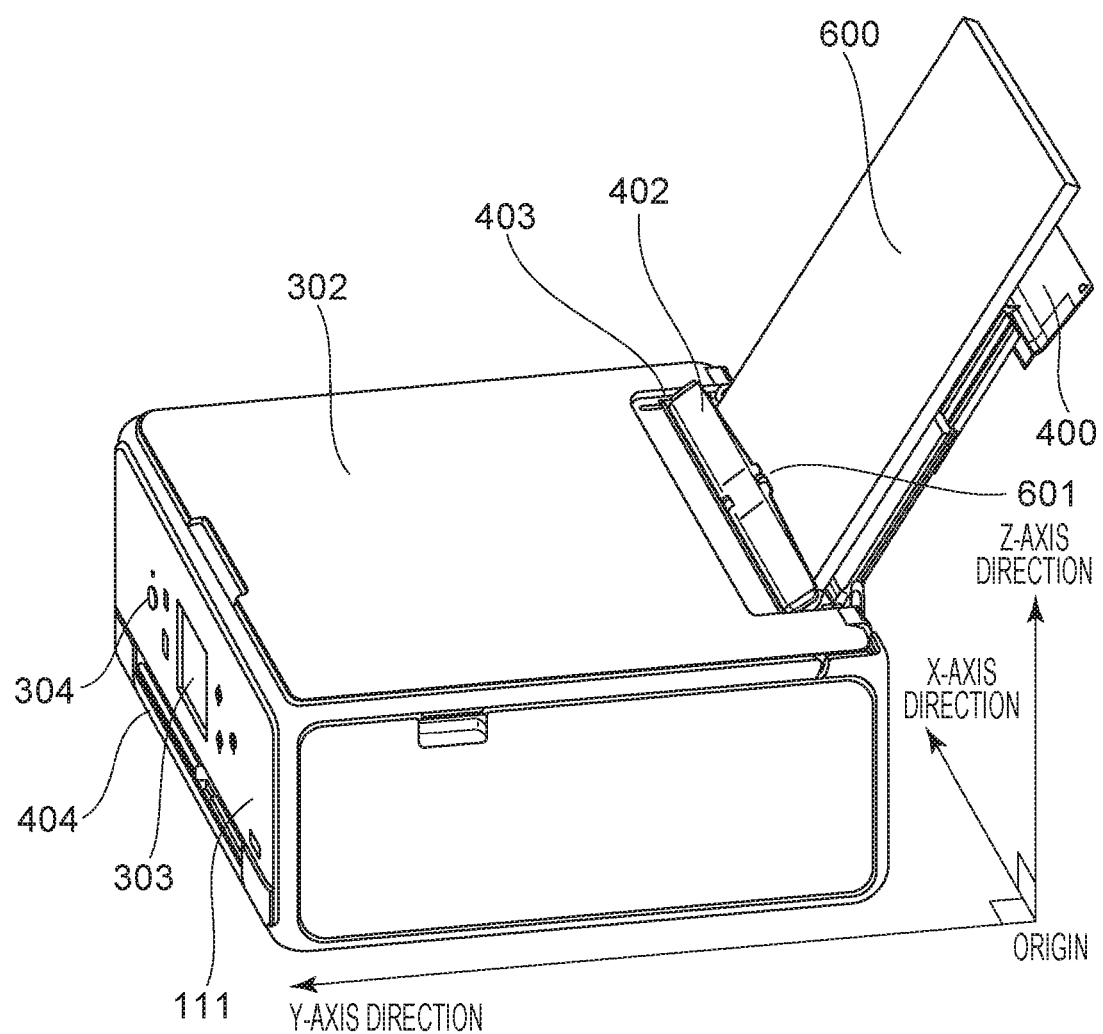
FIG. 6 is an external perspective view of the printing apparatus in loading of paper in the feeding tray in the first embodiment.

FIG. 6 is an external perspective view when paper 600 is loaded in the feeding tray 400. The paper 600 is loaded in the feeding tray 400, the position of the paper is restricted by the paper guide 500, and the cover 402 is closed to complete the loading operation of the paper 600. A rotatable roller 601 that is in contact with the paper when the cover 402 is closed is provided on the cover 402. Although one roller 601 is provided at the center of the cover 402 in the first embodiment, multiple rollers may be provided in the width direction of the paper. Since the roller 601 is rotatable, the roller 601 does not hinder the feeding of the paper during the feeding of the paper 600.

The recording operation will now be described. As described above, the printing unit 110 is provided in the housing of the printing apparatus 100 and includes the recording head that performs the recording on the paper and a feeding roller and a conveyance roller for conveying the paper. In addition, the printing unit 110 includes a feeding motor for driving the feeding roller and a conveyance motor for driving the conveyance roller. The feeding roller rotates in response to a feeding instruction issued from the CPU 102 to the printing unit 110 via the printer I/F 105. The feeding roller feeds the topmost sheet of the paper 600 loaded in the feeding tray 400 in the positive direction in the Y-axis direction and the paper 600 is fed to the inside of the housing. Upon transfer of the image data from the CPU 102 to the printing unit 110 via the printer I/F 105, the printing unit 110 performs the recording operation while repeating the discharge of ink by the recording head and the conveyance by the conveyance roller. The conveyance direction is the positive direction in the Y-axis direction. In other words, the paper 600 is conveyed from the back side of the printing apparatus 100 to the front side thereof and, when the recording operation is completed, the paper 600 is ejected to the front side of the printing apparatus 100. The ejected paper 600 is discharged on the paper discharge tray (not illustrated) provided at the front side of the printing apparatus 100 and at the rear side of the panel.

When the paper 600 is removed from the feeding tray 400 in the state in which the cover 402 is closed, the cover 402 is closed, as in the state in which the paper is not loaded in the feeding tray 400 illustrated in FIG. 4. It is necessary to open the cover 402 to set the cover 402 to the state illustrated in FIG. 5 in order to load the paper 600 in the feeding tray 400 again. Also when the paper is further loaded in the state in which the paper 600 has been loaded in the feeding tray 400, the cover 402 is opened and, then, the paper is additionally loaded.

FIG. 7A and FIG. 7B are diagrams illustrating the relationship between the paper 600 and the position of the paper guide 500. FIG. 7A is a diagram when the paper 600 of A4 size is loaded in the feeding tray 400 and the paper guide 500 is moved to adjust the paper guide 500 so as to be matched with the width in the X-axis direction of the paper 600 of the A4 size. In contrast, FIG. 7B is a diagram when the paper 600 of a size of Photo 89 mm×127 mm is loaded in the feeding tray 400 and the paper guide 500 is moved to adjust the paper guide 500 so as to be matched with the width in the X-axis direction of the paper 600 of the size of Photo 89 mm×127 mm. Since the position of the paper guide 500 is matched with the paper 600 of different sizes in FIG. 7A and FIG. 7B, the position in the X-axis direction of the paper guide 500 in FIG. 7A is different from that in FIG. 7B. Performing a width detection operation enables paper size groups described below (hereinafter also referred to as groups) to be determined. In the width detection operation, the difference in the physical position of the paper guide 500 is detected using the paper guide sensor 116.

FIG. 8 is a table indicating the relationship between the AD values acquired by the paper guide sensor 116 and the paper size groups. The names of paper templates included in the respective paper size groups are also indicated in FIG. 8. The information in the relational table is stored in the ROM 103 in advance and the CPU 102 is capable of reading out the information, if needed. In the first embodiment, Group 1 to Group 7 that are classified based on the width in the X-axis direction of the paper are used as the paper size groups. A minimum width and a maximum width are defined for each paper size group. The AD value detected at the minimum width is a maximum AD value and the AD value detected at the maximum width is a minimum AD value. The maximum AD value and the minimum AD value are used as threshold values for determining the respective paper size groups. However, the paper sizes of part of the paper templates may be across the threshold values of the paper size groups due to a detection error by the paper guide sensor 116 or an error in the position of the paper guide 500, which is caused by the user's operation. The paper having the paper size that may be across the threshold values of the paper size groups is defined as "OVERLAPPED" in OVERLAPPING in the table in FIG. 8 and belongs to multiple paper size groups. For example, when the paper of a size of Envelope (90 mm×205 mm) vertical is loaded in the feeding tray 400 and the position of the paper guide 500 is matched with the paper of this size, the CPU 102 determines that the paper belongs to Group 2 or Group 3.

A processing flow in the determination of the paper size is described with reference to FIG. 8. It is assumed that the user loads the paper of a "NAME CARD" size, which is a paper template, in the feeding tray 400 and closes the cover 402. The sensor unit control module 214 acquires the AD value of the paper guide sensor 116 included in the sensor unit 112 via the sensor I/F 107. It is assumed that the acquired AD value is 880. The acquired AD value of 880 is input into the sensor control application 202. The sensor control application 202 determines the paper size group of the paper 600 loaded in the feeding tray 400 based on the input AD value and the maximum AD value and the minimum AD value illustrated in FIG. 8. Since the acquired AD value is 880, which corresponds to Group 1 having the maximum AD value of 1,024 and the minimum AD value of 880, the sensor control application 202 determines that the paper 600 loaded in the feeding tray 400 is the paper of Group 1. When only one paper template belongs to the group, such as "NAME CARD" in Group 1 or "A5" in Group 5, the paper size is determined by identifying the group.

Although the seven paper size groups are set in the first embodiment, the number of the paper size groups may be smaller than seven or greater than seven. Since determination of the paper size is enabled, instead of the determination of the paper size group, depending on the detection accuracy by the paper guide sensor 116 or the number of the paper sizes subjected to the determination, the determination of the paper size may be performed. In addition, although a paper size group sensor is a resistance value sensor and the output from the sensor is the AD value in the first embodiment, the paper size group sensor is not limited to the resistance value sensor and the output from the sensor is not limited to the AD value. For example, an optical sensor may be used to perform the determination using the value of light intensity. Alternatively, multiple toggle sensors may be used to perform the determination using an output of a combination of two values: ON and OFF. The contents of the sensor threshold values in the relational table in FIG. 8 may be varied depending on the sensor configuration.

FIG. 9 is a table indicating paper information held in the ROM 103. Paper size information held in the first embodiment is roughly classified into three kinds: loaded paper information, group history information, and control flag information. The loaded paper information is the information about the loaded paper that is currently loaded.

The loaded paper information is composed of the paper size, a paper type, and the paper size group and indicates the information about the paper 600 loaded in the feeding tray 400. The loaded paper information is updated when the determination of the paper size group described below is performed and when the user sets the paper information. The determination of the paper size group is performed when the closing of the cover 402 is detected, at the start of the recording, and when the power is turned on, which are described in detail below.

The group history information is history information about the paper 600 that was loaded in the feeding tray 400 by the user, which is held for each paper size group. Only the latest paper information that is used, in the group, is stored in the group history information in FIG. 9. The paper information corresponding to multiple times of usage may be held as the history information about each paper size group. The group history information is updated when the determination of the paper size group is performed and when the user sets the paper information, as in the loaded paper information. Accordingly, the information about the paper size and the paper type in the group history information coincides with the paper size and the paper type of the group of the paper that is currently loaded.

The loaded paper information and the group history information may be stored not only for the paper loaded in the feeding tray 400 but also for the paper loaded in the cassette 404. It is assumed in the first embodiment that the loaded paper information and the group history information are stored also for the paper loaded in the cassette 404.

The control flag information is composed of an inconsistency detection flag and a paper width detection flag. The inconsistency detection flag is used in detection of paper information inconsistency (FIG. 15) described below. The paper width detection flag is used in the determination of the paper size group (FIG. 11) described below. The user is capable of arbitrarily switching the control flag information to ON (=valid) or OFF (=invalid) by operating the indicator 303 or the input keys 304 on the operation unit 111.

FIG. 9 is a table illustrating an example of the paper information held in the ROM 103. Referring to FIG. 9, the paper size of the paper 600 currently loaded in the feeding tray 400 is the A4 size and the paper type thereof is Plain paper. Since the paper size group is Group 7, the paper size of Group 7 and the paper type of Group 7 in the group history information coincide with those in the loaded paper information. Although only the paper information loaded in the feeding tray 400 is indicated in the first embodiment, the paper information may be similarly held for the paper loaded in another feeding port, such as the cassette 404.

Figure 10:
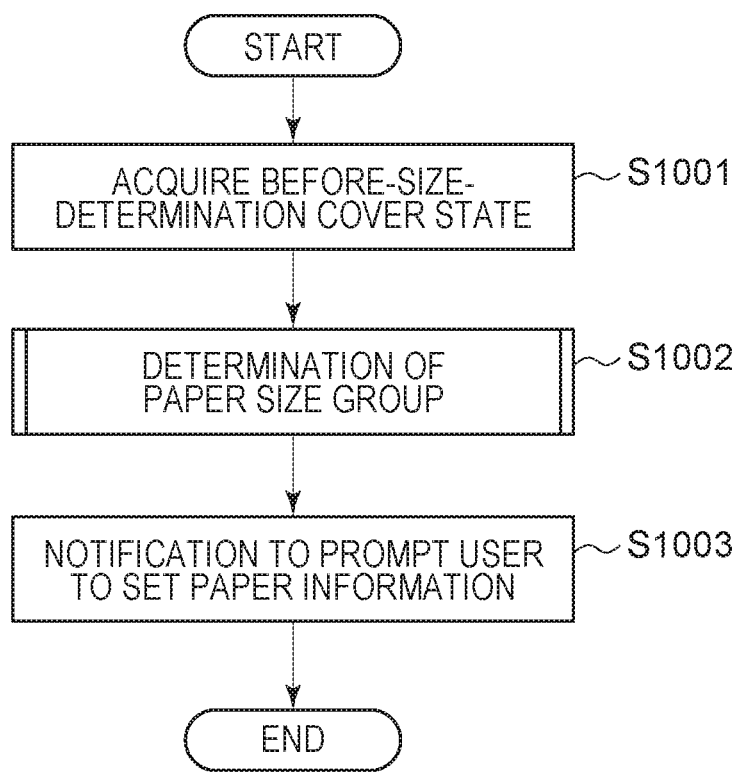
FIG. 10 is a flowchart illustrating a process when the cover is closed in the first embodiment.

FIG. 10 is a flowchart illustrating a process performed by the CPU 102 when the user closes the cover 402. The process illustrated in FIG. 10 is described on the assumption that the cover sensor 115 of the first embodiment is a toggle switch (SW), that "the cover is closed" when the sensor value is zero and "the cover is opened" when the sensor value is one, and that the contents of the data indicated in FIG. 9 are used as initial values of the paper size information stored in the ROM 103.

As described above, it is necessary for the user to open the cover 402 in exchange of the paper 600 loaded in the feeding tray 400. After the paper exchange, the user adjusts the paper guide 500 so as to be matched with the position of the paper 600 and closes the cover 402. Since the paper 600 is exchanged through the series of processing described above, it is determined that the exchange of the paper 600 is completed when the cover 402 is closed and the cover sensor 115 detects the "the cover is closed."

Referring to FIG. 10, in Step S1001, the CPU 102 acquires the state of the cover 402. The CPU 102 acquires the sensor value of the cover sensor 115 included in the sensor unit 112 via the sensor I/F 107 to determine the state of the cover 402. The CPU 102 temporarily stores the determined state of the cover 402 in the RAM 104. The state of the cover 402 detected in Step S1001 is referred to as a "before-size-determination cover state." The "before-size-determination cover state" is used to determine whether the cover 402 is opened during the determination of the paper size group in Step S1105 in the determination of the paper size group (FIG. 11) described below. The before-size-determination cover state is "the cover is closed" in Step S1001.

Figure 11:
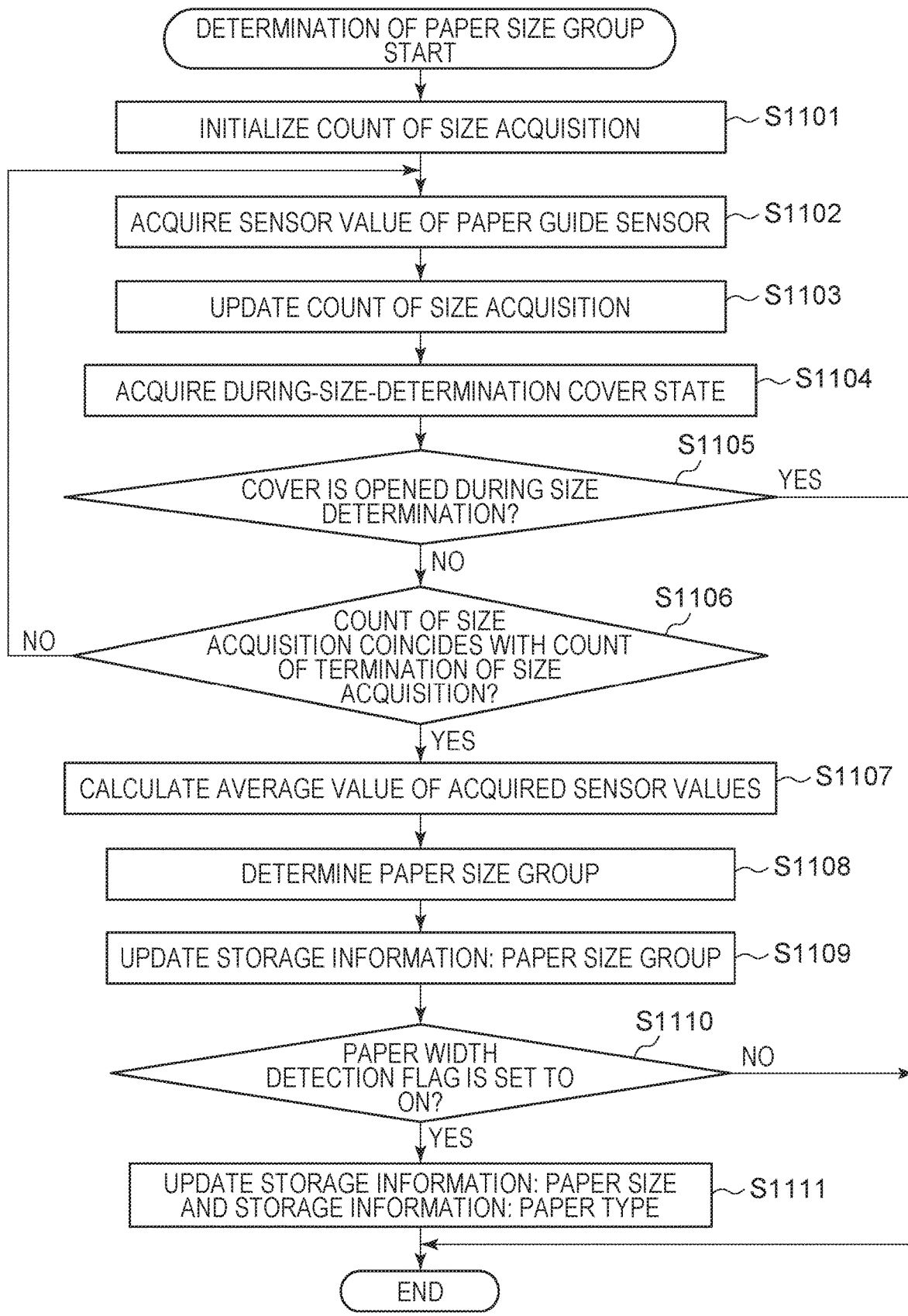
FIG. 11 is a flowchart illustrating a process of determining the paper size group in the first embodiment.

In Step S1002, the CPU 102 performs the determination of the paper size group (FIG. 11). The determination of the paper size group will be described in detail below.

In Step S1003, the CPU 102 prompts the user to set the paper information in the indicator 303. Then, the process in FIG. 10 is terminated.

FIG. 11 is a flowchart illustrating the process of determining the paper size group. The process illustrated in FIG. 11 corresponds to Step S1002 in FIG. 10. A sensor value of the paper guide sensor 116 is acquired as the width detection operation to detect the width of the paper 600 to determine the paper size group from the relational table illustrated in FIG. 8.

Referring to FIG. 11, in Step S1101, the CPU 102 initializes a count of size acquisition temporarily held in the RAM 104 (sets zero as the count of size acquisition). The count of size acquisition is a variable indicating how many times the sensor value of the paper guide sensor 116 is acquired and is the number of times when the acquisition of the AD value of the resistance type sensor is performed in the first embodiment. The count of size acquisition is used in determination of whether the repetition of the acquisition of the sensor value is to be terminated in Step S1106 described below.

In Step S1102, the CPU 102 acquires the sensor value of the paper guide sensor 116 included in the sensor unit 112 via the sensor I/F 107. In Step S1103, the CPU 102 updates the count of size acquisition in the RAM 104 to a value incremented by one. The acquired sensor value is used in Step S1107 described below.

In Step S1104, the CPU 102 acquires the sensor value of the cover sensor 115 included in the sensor unit 112 via the sensor I/F 107 to acquire the state of the cover 402. The state of the cover 402 acquired in Step S1104 is referred to as a "during-size-determination cover state." In Step S1105, the CPU 102 determines whether the state of the cover 402 acquired in Step S1104 is changed to "the cover is opened." The determination of "the cover is opened" means that the cover 402 is opened by the user during the determination of the paper size group. Since the exchange of the paper or the like may be performed and the size of the paper 600 loaded in the feeding tray 400 may be varied when the user opens the cover 402, the determination of the paper size group is stopped. The before-size-determination cover state acquired in Step S1001 in FIG. 10 or Step S1403 in FIG. 14 described below and the during-size-determination cover state are used for the determination. If the before-size-determination cover state is "the cover is closed" and the during-size-determination cover state is "the cover is opened" (YES in Step S1105), the CPU 102 determines that the cover 402 is opened during the size determination and the determination of the paper size group in FIG. 11 is terminated. Since the cover 402 is kept closed if the before-size-determination cover state is "the cover is closed" and the during-size-determination cover state is "the cover is closed" (NO in Step S1105), the process goes to Step S1106. If the before-size-determination cover state is "the cover is opened", the process goes to Step S1106 regardless of the during-size-determination cover state.

In Step S1106, the CPU 102 determines whether the count of size acquisition coincides with a count of termination of size acquisition. The count of termination of size acquisition is set in advance and is held in the ROM 103. The count of termination of size acquisition indicates how many times the acquisition of the sensor value of the paper guide sensor 116 is performed. Steps S1102 to S1106 are repeated until the count of size acquisition reaches the count of termination of size acquisition. If the count of size acquisition reaches the count of termination of size acquisition (YES in Step S1106), the process goes to Step S1107.

In Step S1107, the CPU 102 calculates the average value of the sensor values acquired by the paper guide sensor 116 in Step S1102. The calculated average value is stored in the ROM 103 as the result of detection by the paper guide sensor 116. Performing the acquisition of the sensor value multiple times and using the average value as the result of detection enable an error of the sensor value, which is caused by noise or the like, to be reduced.

In Step S1108, the CPU 102 determines the paper size group of the paper loaded in the feeding tray 400 from the result of detection by the paper guide sensor 116, which is stored in the ROM 103, and the sensor threshold values. Specifically, the CPU 102 determines the group the result of detection of which is within a range from the maximum AD value to the minimum AD value, which are the sensor threshold values in the relational table of the paper size groups illustrated in FIG. 8, to be the group of the loaded paper.

In Step S1109, the CPU 102 updates the information about the paper size group in the loaded paper information included in the paper information (FIG. 9) stored in the ROM 103 to the paper size group determined in Step S1108.

In Step S1110, the CPU 102 confirms the value of the paper width detection flag (refer to FIG. 9) in the paper information stored in the ROM 103. The paper width detection flag specifies whether the paper size and the paper type in the loaded paper information are updated with the history information about the paper size group acquired in the determination of the paper size group. If the paper width detection flag is set to OFF (=invalid) (NO in Step S110), the determination of the paper size group is terminated. If the paper width detection flag is set to ON (=valid) (YES in Step S1110), the process goes to Step S1111.

In Step S1111, the CPU 102 updates the paper size and the paper type in the loaded paper information included in the paper information (FIG. 9) stored in the ROM 103 with the history information about the paper size group acquired in the determination of the paper size group. Updating the paper size group in Step S1109 regardless of the value of the paper width detection flag enables the information about the paper size and the paper type in the loaded paper information to be updated with the group history information when the paper width detection flag is changed from OFF to ON. If the loaded paper information is updated with the paper width detection flag being set to OFF when the paper size group is not updated in Step S1109, the updated information may not coincide with the information about the paper 600 loaded in the feeding tray 400. In this case, the information that is not consistent with the information about the paper that is loaded is kept as the loaded paper information until the next determination of the paper size group is performed even if the paper width detection flag is set to ON. Accordingly, in the first embodiment, the paper size group is updated in Step S1109 regardless of the value of the paper width detection flag. With the above process, it is possible to successfully address the inconsistency by updating the paper size and the paper type in the loaded paper information with the group history information when the paper width detection flag is changed from OFF to ON.

With the determination of the paper size group described above, it is possible to automatically update the paper information stored in the ROM 103 with the history information in the paper information corresponding to the position of the paper guide 500.

The processes in FIG. 10 and FIG. 11 will now be described using a specific example. A case is considered here in which the paper exchange into the paper size: Postcard and the paper type: Glossy paper is performed. It is assumed that the paper of the paper size: A4 and of the paper type: Plain paper is loaded in the feeding tray 400 as a state before the paper exchange. It is also assumed that the paper information stored in the ROM 103 is the data illustrated in the table in FIG. 9. Notification screens when the paper exchange is detected in the above example are illustrated in FIG. 12A to FIG. 12E, and the results of update of the paper information are illustrated in FIG. 13A and FIG. 13B.

The CPU 102 acquires the sensor value of zero, which indicates that "the cover is closed", as the before-size-determination cover state in Step S1001.

Next, the CPU 102 performs the determination of the paper size group illustrated in FIG. 11 in Step S1002. The CPU 102 initializes the count of size acquisition in Step S1101 and acquires the sensor value output from the paper guide sensor 116 until the count of size acquisition coincides with the count of termination of size acquisition in Steps S1102 to S1106. The CPU 102 calculates the average value of the acquired sensor output values as the result of detection in Step S1107 and determines that the loaded paper (Postcard) corresponds to Group 3 from the result of detection and the relational table (FIG. 8) of the paper size groups in Step S1108. The CPU 102 updates the information about the paper size group in the loaded paper information in the paper information to Group 3 in Step S1109. If the paper width detection flag is set to ON, the determination in Step S1110 is affirmative (YES) and the process goes to Step S1111. The CPU 102 updates the paper size in the loaded paper information to "4×6" and the paper type therein to "Glossy paper" based on the group history information in Group 3 determined in Step S1109 in Step S1111. The updated paper information is indicated in FIG. 13A. Upon completion of the determination of the paper size group, the CPU 102 displays the paper size and the paper type, which are currently set, in the indicator 303 to notify the user of the paper size and the paper type, which are currently set, as illustrated in FIG. 12A, in Step S1003. The user touches "Yes" if the paper size and the paper type displayed in FIG. 12A coincide with those of the paper which the user has loaded and, otherwise, touches "Update." When the user touches "Yes", a screen illustrated in FIG. 12E is displayed and the setting of the paper information is completed. The CPU 102 may recognize that the user agrees with the contents of the display when no operation is performed by the user for a predetermined time and the setting of the paper information may be terminated. In this example, since the paper size of the paper which the user has loaded is "Postcard", the paper size and the paper type displayed in FIG. 12A do not coincide with those of the paper which the user has loaded. The user touches "Update" if the paper size and the paper type displayed in FIG. 12A do not coincide with those of the paper which the user has loaded. When "Update" is touched, the CPU 102 displays a screen illustrated in FIG. 12B in the indicator 303. The user is capable of updating the setting of the paper size upon display of the screen in FIG. 12B. At this time, the paper size displayed as an option is the paper size corresponding to Group 3. The user selects "Postcard" here. Upon selection of the paper size, the CPU 102 displays a screen illustrated in FIG. 12C in the indicator 303. The user is capable of updating the setting of the paper type upon display of the screen in FIG. 12C. The user selects "Glossy paper" here. Upon selection of the paper type, the CPU 102 displays a confirmation screen illustrated in FIG. 12D in the indicator 303. Since the paper size and the paper type displayed on the screen in FIG. 12D coincide with the paper size and the paper type of the loaded paper, the user touches "Yes." Upon touch of "Yes", the CPU 102 displays the screen illustrated in FIG. 12E in the indicator 303 and the setting of the paper information is completed. At this time, the paper information is updated to information illustrated in FIG. 13B.

As described above with reference to FIG. 10 to FIG. 13A and FIG. 13B, if the paper loaded in the feeding tray 400 coincides with the paper stored in the history information when the user closes the cover 402, the user is capable of terminating the setting of the paper without setting the paper size and the paper type. Even if the paper loaded in the feeding tray 400 does not coincide with the paper stored in the history information, limiting the option to be displayed in the setting of the paper size by the user to the option corresponding to the determined group enables the time and effort and an occurrence of an input error in the setting of the paper to be reduced.

Although the paper information to be set includes the paper size and the paper type in the above description, the paper information to be set may be only the paper size. However, setting of the paper type enables the amount of discharge of ink and the amount of conveyance, which correspond to the paper type, to be applied in the recording.

Figure 14:
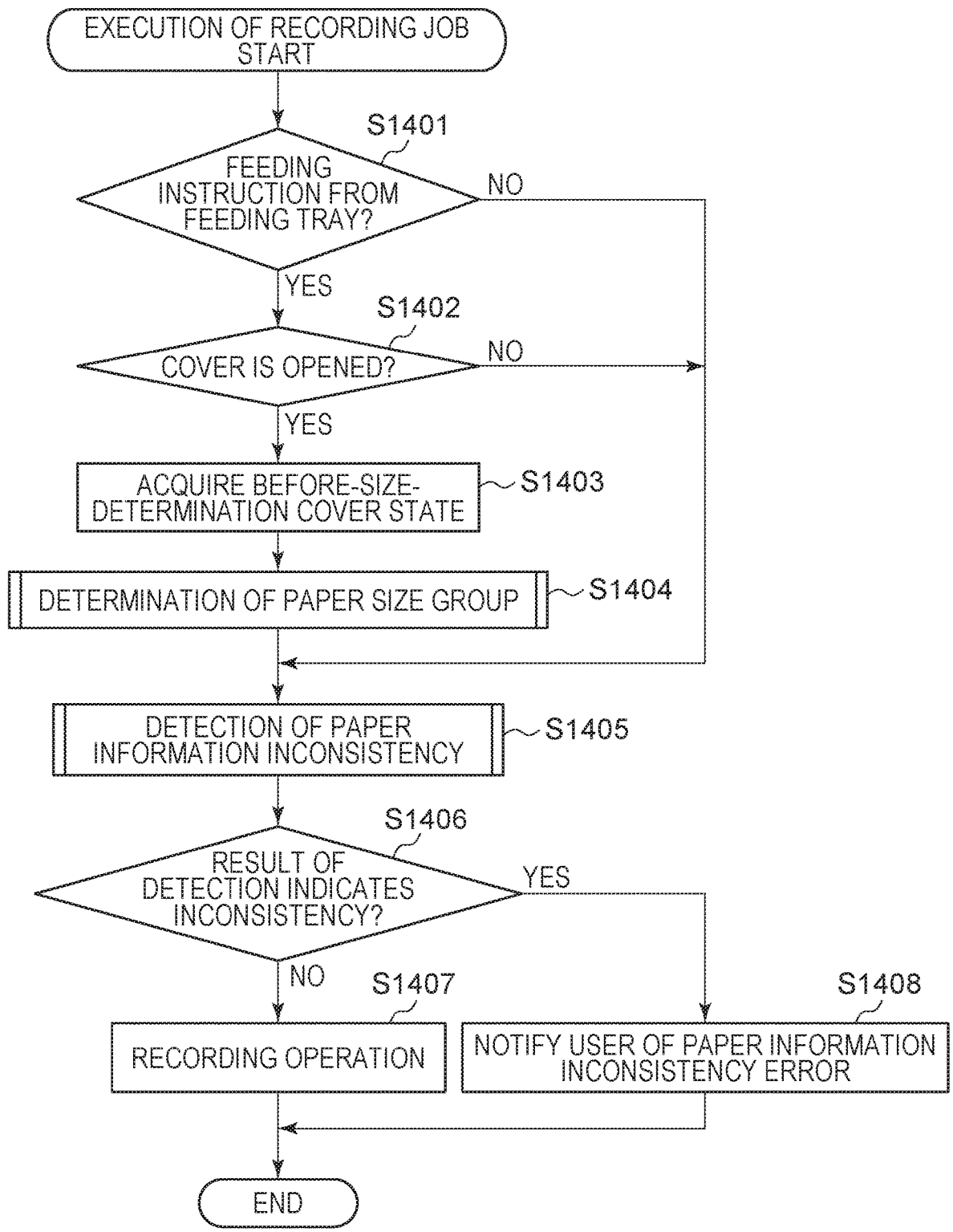
FIG. 14 is a flowchart illustrating a process in execution of a recording JOB in the first embodiment.

FIG. 14 is a flowchart illustrating a process that is performed when the recording operation of a recording JOB (recording job) is performed. The recording JOB indicates recording information including the image data to be recorded and recording settings. When the user instructs the printing apparatus 100 to perform the recording operation from the operation unit 111 in the printing apparatus 100 or the host computer 113, the recording JOB is created and the created recording JOB is transmitted to the printing apparatus 100. The CPU 102, which receives the recording JOB, performs image processing of the image data and performs the recording operation with the printing unit 110 via the printer I/F 105. When the cover 402 is opened during the recording JOB, the setting of the paper information through the process illustrated in FIG. 10 may not be performed or the paper may be exchanged by the user. Accordingly, the printing apparatus 100 sets the paper information about the paper loaded in the feeding tray 400 upon reception of the recording JOB. The process illustrated in FIG. 14 is performed by the CPU 102 in accordance with a program stored in the ROM 103.

Referring to FIG. 14, in Step S1401, the CPU 102 analyzes the information about the recording JOB to determine whether an instruction to feed the paper 600 loaded in the feeding tray 400 is issued. Since the paper is capable of being fed from the two places: the feeding tray 400 and the cassette 404 to the printing apparatus 100 of the first embodiment, the user sets the loading unit from which the paper is fed. If the paper 600 loaded in the feeding tray 400 is fed (YES in Step S1401), the process goes to Step S1402. If the paper 600 loaded in the feeding tray 400 is not fed (NO in Step S1401), that is, if the paper feeding is performed from the cassette 404 in the first embodiment, the process goes to Step S1405.

In Step S1402, the CPU 102 acquires the state of the cover 402. The CPU 102 acquires the sensor value of the cover sensor 115 via the sensor I/F 107 to determine the state of the cover 402. If the cover sensor 115 detects "the cover is opened" (YES in Step S1402), the user may open the cover 402 to exchange the paper 600. Since it is necessary to update the paper information in this case, the process goes to Step S1403. If the cover sensor 115 detects "the cover is closed (NO in Step S1402), the process in FIG. 10 when the cover is closed has been performed and the paper information has been updated in the manner illustrated in FIG. 12A to FIG. 12E. Accordingly, since it is not necessary to perform the determination of the paper size group in the recording operation in this case, the process goes to Step S1405.

In Step S1403, the CPU 102 performs the same processing as in Step S1001 in FIG. 10 and temporarily stores the acquired before-size-determination cover state of the cover 402 in the RAM 104. The before-size-determination cover state is "the cover is opened" in Step S1403.

In Step S1404, the CPU 102 performs the determination of the paper size group illustrated in FIG. 11 to update the paper information stored in the ROM 103 to the information corresponding to the position of the paper guide 500.

In Step S1405, the CPU 102 performs the detection of paper information inconsistency. The CPU 102 determines whether the paper information that is set so as to be loaded in the feeding tray 400 coincides with the paper information set in the recording JOB in Step S1405. This step will be described in detail below with reference to FIG. 15. In Step S1406, the CPU 102 determines whether the result of detection in Step S1405 indicates inconsistency. Step S1406 is performed so that the recording on wrong paper or the recording on a portion other than the surface of the paper (in the housing of the printing apparatus 100) is not performed.

If the result of detection does not indicate inconsistency (NO in Step S1406), the paper information set in the ROM 103 coincides with the paper information in the recording JOB and, thus, the CPU 102 determines that the recording operation is continuable, such as being able to be continued. In this case, the process goes to Step S1407. If the result of detection indicates inconsistency (YES in Step S1406), the process goes to Step S1408.

In Step S1407, the CPU 102 issues the instruction to feed the paper to the printing unit 110 via the printer I/F 105 to drive the feeding roller in order to feed the paper from the loading unit specified in the recording JOB and feeds the paper in the housing of the printing apparatus 100. Then, the CPU 102 transfer the data about an image to be recorded to the printing unit 110 via the printer I/F 105 and the printing unit 110 performs the recording operation while repeating the discharge of ink by the recording head and the conveyance by the conveyance roller. Upon completion of the recording of the image, the CPU 102 issues an instruction to eject the paper to the printing unit 110 via the printer I/F 105. The paper for which the recording operation is completed is ejected and the recording operation is completed. Upon completion of the recording operation, the process illustrated in FIG. 14 is terminated.

In Step S1408, the CPU 102 displays a paper information inconsistency error in the indicator 303 to notify the user of the paper information inconsistency error. Then, the process illustrated in FIG. 14 is terminated.

Figure 15:
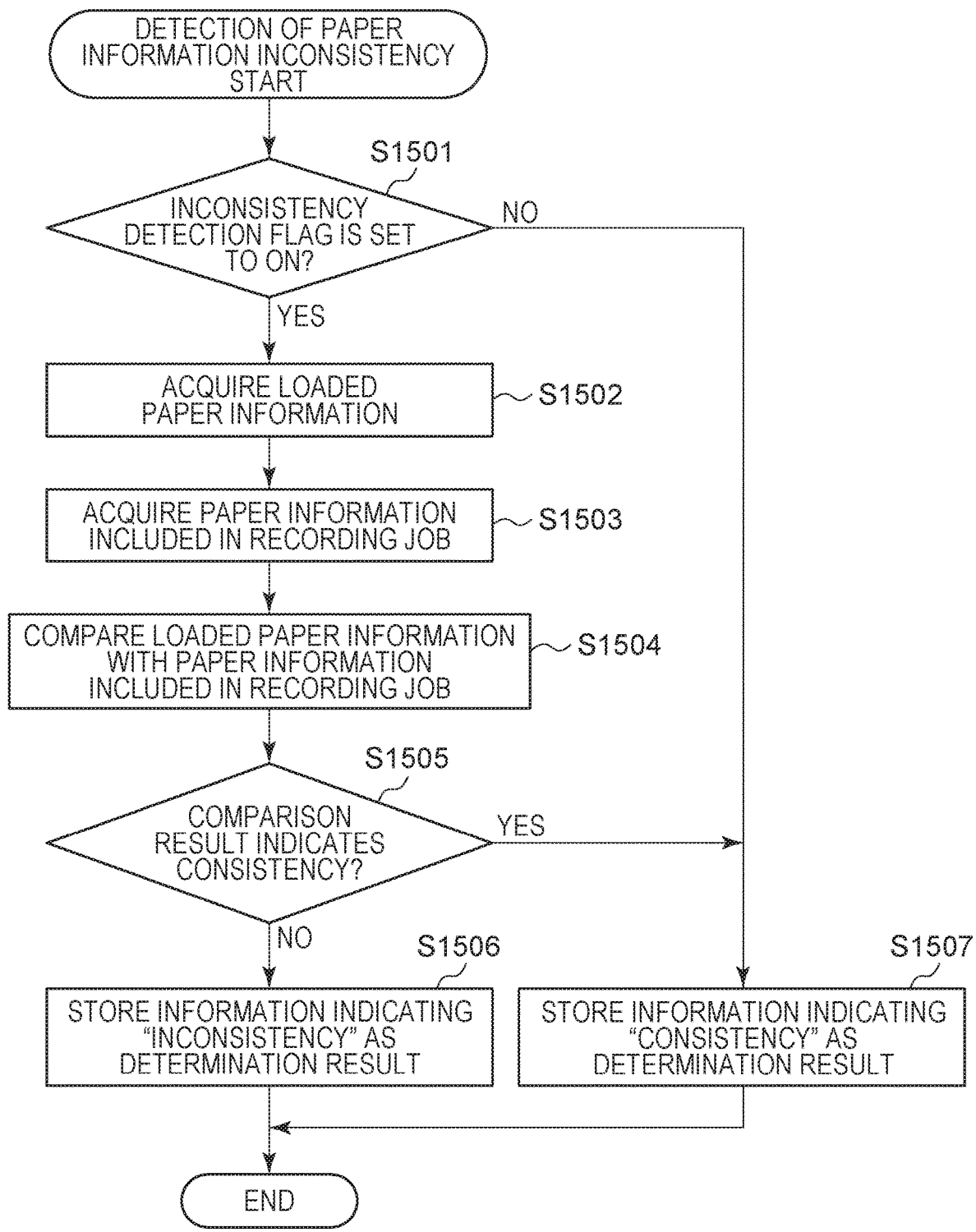
FIG. 15 is a flowchart illustrating a process of detecting paper information inconsistency in the first embodiment.

FIG. 15 is a flowchart illustrating the process of detecting paper information inconsistency in Step S1405 in FIG. 14.

Referring to FIG. 15, in Step S1501, the CPU 102 confirms the value of the inconsistency detection flag in the paper information. The inconsistency detection flag is set in advance to indicate whether the user performs the detection of paper information inconsistency and is stored in the ROM 103. If the inconsistency detection flag is set to OFF (=invalid) (NO in Step S1501), in Step S1507, the CPU 102 temporarily stores information indicating that the paper information is "consistent" in the RAM 104. Then, the process of detecting paper information inconsistency in FIG. 15 is terminated. If the inconsistency detection flag is set to ON (=valid) (YES in Step S1501), the process goes to Step S1502.

In Step S1502, the CPU 102 acquires the information about the paper size and the paper type in the loaded paper information included in the paper information (FIG. 9) stored in the ROM 103. In Step S1503, the CPU 102 acquires the information about the paper size and the paper type included in the recording JOB.

In Step S1504, the CPU 102 compares the loaded paper information acquired in Step S1502 with the paper information included in the recording JOB, acquired in Step S1503. In Step S1505, the CPU 102 determines whether the result of comparison indicates consistency. If the CPU 102 determines that the result of comparison indicates consistency (YES in Step S1505), in Step S1507, the CPU 102 temporarily stores information indicating that the result of comparison indicates consistency in the RAM 104. Then, the process of detecting paper information inconsistency in FIG. 15 is terminated. If the CPU 102 determines that the result of comparison indicates inconsistency (NO in Step S1505), in Step S1506, the CPU 102 temporarily stores information indicating that the result of comparison indicates inconsistency in the RAM 104. Then, the process of detecting paper information inconsistency in FIG. 15 is terminated.

FIG. 16A and FIG. 16B illustrate screens displayed in the indicator 303 in Step S1408 in FIG. 14. A case is described here in which the paper size set in the recording JOB is the A4 size, the paper type set therein is Plain paper, the paper size of the paper 600 loaded in the feeding tray 400 is a B5 size, and the paper type thereof is Plain paper as a specific example.

First, an error notification illustrated in FIG. 16A is displayed in the indicator 303. When the user touches "Next" displayed in the screen, a paper exchange notification screen illustrated in FIG. 16B is displayed in the indicator 303. The user opens the cover 402 when the cover 402 is closed in response to the instruction, exchanges the paper, and closes the cover 402. Upon closing of the cover 402, the paper information setting screen in FIG. 12A is displayed. The user performs the same operation as in the setting of the paper information described above with reference to FIG. 12A to FIG. 12E to set the paper information. If the set paper information coincides with the paper information in the recording JOB, the paper information inconsistency error is cleared. Upon clearance of the paper information inconsistency error, the CPU 102 starts the recording operation again to perform Step S1401. Although the characters are displayed in the indicator 303 to notify the user of the error in the first embodiment, the user may be notified of the error by, for example, turning on the LED. Alternatively, the user may be notified of the error by, for example, sequentially and continuously turning on multiple LEDs, varying the interval at which the respective LEDs are turned on, or varying the color of each LED.

As described above with reference to FIG. 14 to FIG. 16A and FIG. 16B, when the state of the cover 402 is "the cover is opened" in the recording operation, the determination of the paper size group is performed after receiving the recording JOB to update the paper information. In addition, since the detection of paper information inconsistency is performed after updating the paper information, the start of the recording is stopped if the paper 600 the paper information about which does not coincide with the paper information in the recording JOB is loaded in the feeding tray 400. It is possible to improve the user-friendliness while preventing the recording of the image on wrong paper in the above manner.

Figure 17:
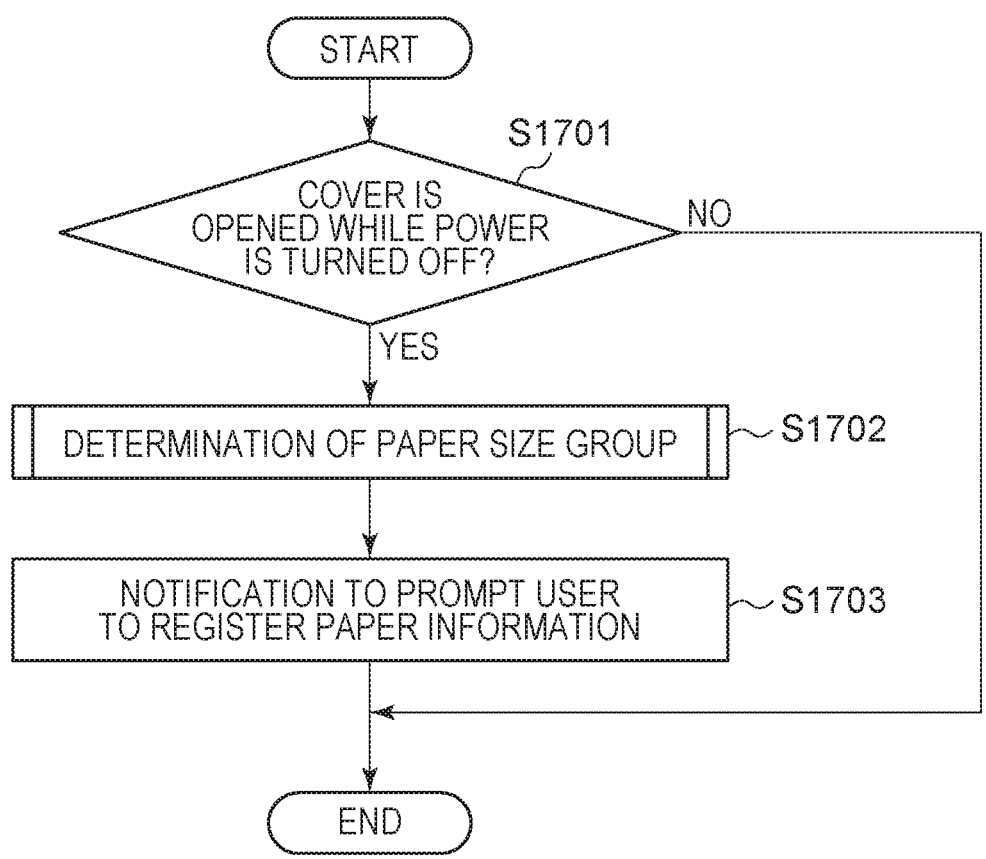
FIG. 17 is a flowchart illustrating a process when the power is turned on in the first embodiment.

FIG. 17 is a flowchart illustrating a process that is performed when the user depresses the power button included in the input keys 304 in the operation unit 111 to turn on the printing apparatus 100 and the power is turned on. A state in which control of the operations of components that are not related to control of required functions, among the components included in the printing apparatus 100, is stopped is considered as a power-off state in which the power is turned off in the first embodiment. For example, the control of the operations in the printing unit 110 and the indicator 303 is stopped in the power-off state. In contrast, the required functions the control of the operations of which is not stopped include a function to detect depression of the power button included in the input keys 304 in the operation unit 111 and the function to detect the sensor value of the cover sensor 115 included in the sensor unit 112. The sensor value of the cover sensor 115 is acquired by the CPU 102 for each or every predetermined time. A power-on state indicates a state in which the operations of all the components included in the printing apparatus 100 are controllable. As described above in the description with reference to FIG. 10, it is necessary to open the cover 402 in the paper exchange. Accordingly, if it is detected that the sensor value of the cover sensor 115 is one in the power-off state, the information indicating that "the cover is opened" is detected is stored in the RAM 104. The process illustrated in FIG. 17 is performed by the CPU 102 in accordance with a program stored in the ROM 103.

When the power is turned on, in Step S1701, the CPU 102 confirms whether the detection of "the cover is opened" is stored in the RAM 104. The opening-closing state of the cover at this time may be the opened state or the closed state. If "the cover is opened" is not detected (NO in Step S1701), the CPU 102 determines that the paper exchange is not performed during the power-off state and the process illustrated in FIG. 17 is terminated. If "the cover is opened" is detected (YES in Step S1701), the CPU 102 determines that the paper exchange may be performed during the power-off state and the process goes to Step S1702.

In Step S1702, the CPU 102 performs the determination of the paper size group illustrated in FIG. 11 to update the paper information stored in the ROM 103 to the information corresponding to the position of the paper guide 500.

Figure 18:
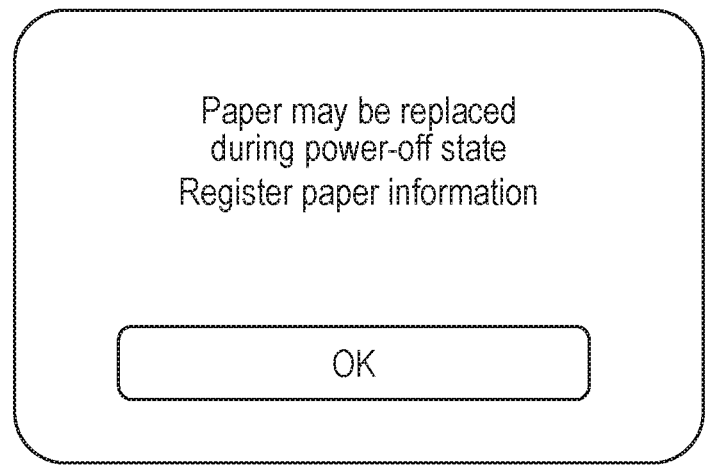
FIG. 18 illustrates a notification screen in the first embodiment.

In Step S1703, the CPU 102 prompts the user to register the paper information in the indicator 303. Then, the process illustrated in FIG. 17 is terminated. FIG. 18 illustrates a screen displayed in the indicator 303 in Step S1703. The paper information setting screen illustrated in FIG. 12A is displayed in response to touching of "OK" on the screen in FIG. 18 by the user. The user performs the same operation as in the setting of the paper information described above with reference to FIG. 12A to FIG. 12E to set the paper information.

According to the first embodiment described above, when the cover 402 is kept opened without being closed, the determination of the paper size group is performed in the execution of the recording JOB to automatically update the information about the paper size and the paper type of the paper loaded in the feeding tray. Accordingly, the user is capable of starting the recording operation even when the cover is opened. The timing when the determination of the paper size group is performed by the paper guide sensor 116 is capable of being limited to the time when a specific operation is performed, for example, when the cover 402 is closed (FIG. 10), when the recording JOB is executed (FIG. 14), or when the power is turned on (FIG. 17). Accordingly, it is not necessary to constantly detect the sensor value of the paper guide sensor 116. As a result, the determination of the paper size group is not performed during a period in which the determination is not required, for example, while the user is operating the paper guide 500, to reduce erroneous detection. In addition, since the number of times of detection is reduced, it is possible to reduce the power consumption of the printing apparatus 100.

Second Embodiment

A case is described in a second embodiment in which a maintenance recording JOB is executed. The maintenance recording JOB indicates the recording JOB for performing a maintenance function of the printing apparatus 100. For example, recording of a recording head operation check pattern for confirming whether the discharge of ink from the recording head is normally performed corresponds to the maintenance recording JOB. The recording operation for maintenance is a function supposing the recording on the paper of a specific size. Accordingly, it is necessary for the user to load the paper of a specific size in the feeding port. A process of determining whether the maintenance recording JOB is executable on the loaded paper in the execution of the maintenance recording JOB will be described in the second embodiment. A description of the same steps as in the first embodiment may be omitted herein.

Figure 19:
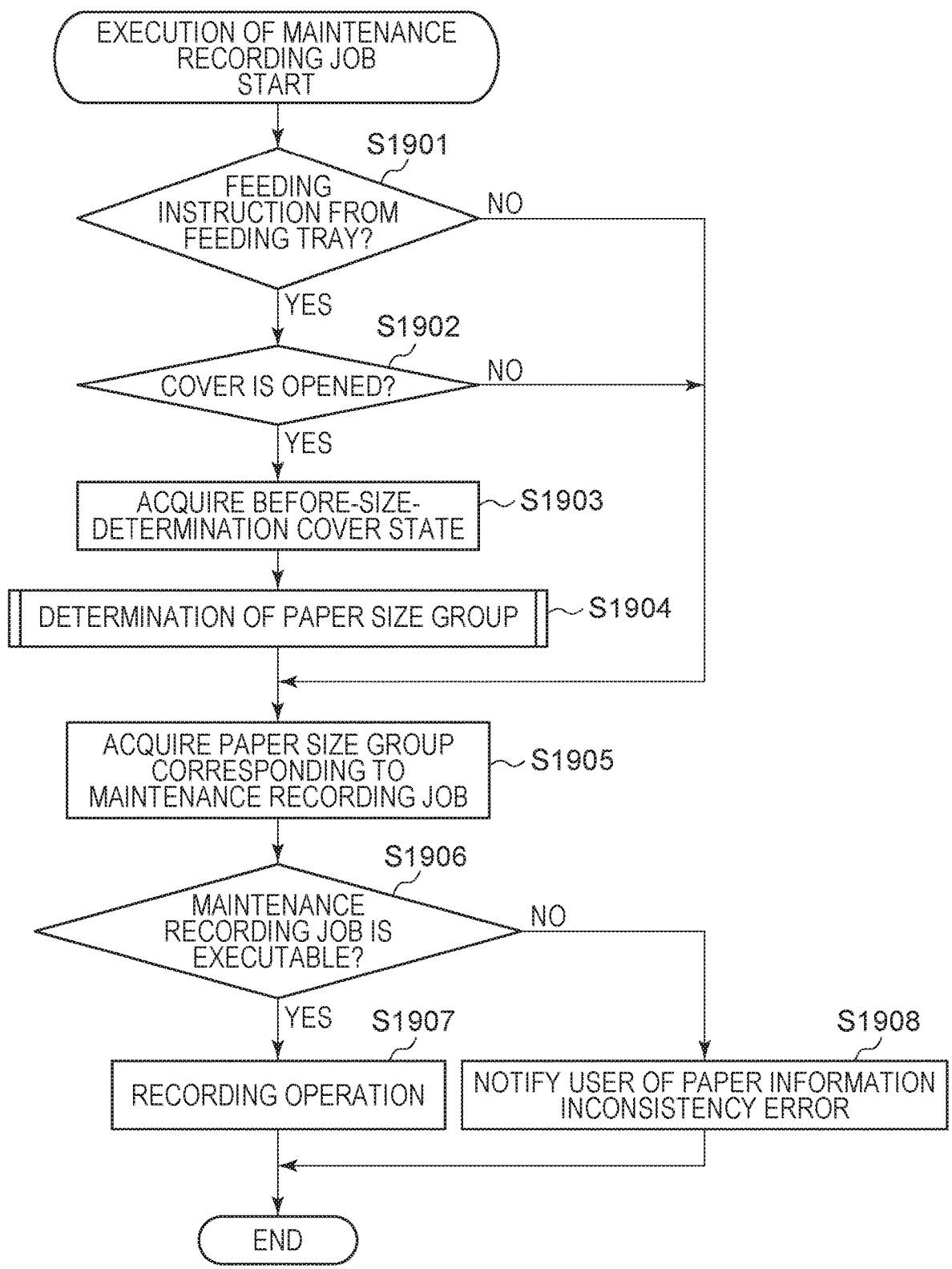
FIG. 19 is a flowchart illustrating a process in execution of a maintenance recording JOB in a second embodiment.

FIG. 19 is a flowchart illustrating a process performed by the CPU 102 in the execution of the maintenance recording JOB. The process illustrated in FIG. 19 is performed by the CPU 102 in accordance with a program stored in the ROM 103.

Referring to FIG. 19, the same processing as in Steps S1401 to S1404 in FIG. 14 is performed in Steps S1901 to S1904. In Step S1901, the CPU 102 determines whether an instruction to feed the paper loaded in the feeding tray 400 or the cassette 404 is issued. If an instruction to feed the paper from the cassette 404 is issued (NO in Step S1901), the process goes to Step S1905. If an instruction to feed the paper from the feeding tray 400 is issued (YES in Step S1901), in Step S1902, the CPU 102 determines the state of the cover 402. If the cover 402 is closed (NO in Step S1902), the process goes to Step S1905. If the cover 402 is opened (YES in Step S1902), in Step S1903, the CPU 102 acquires the before-size-determination cover state. The before-size-determination cover state is "the cover is opened" here. In Step S1904, the CPU 102 performs the determination of the paper size group in FIG. 11 to update the paper information stored in the ROM 103 to the information corresponding to the position of the paper guide 500.

In Step S1905, the CPU 102 acquires the paper size group corresponding to the maintenance recording JOB. In the second embodiment, the CPU 102 acquires the fact that the paper size of the paper 600 that should be loaded in the feeding tray 400 in the recording of the recording head operation check pattern is the A4 size. In addition, the CPU 102 acquires the fact that the paper of the A4 size belongs to Group 7 from the table illustrated in FIG. 8.

In Step S1906, the CPU 102 determines whether the maintenance recording JOB is executable. Specifically, the CPU 102 compares the paper size group acquired in Step S1905 with the paper size group in the loaded paper information in the paper information updated in the determination of the paper size group in Step S1904. If the CPU 102 determines that the instruction to feed the paper from the cassette 404 is issued in Step S1901, the CPU 102 compares the paper size group in the loaded paper information in the cassette 404 stored in the ROM 103 with the paper size group acquired in Step S1905. If the paper size groups coincide with each other as the result of comparison, the CPU 102 determines that the maintenance recording JOB is executable (YES in Step S1906) and the process goes to Step S1907. In Step S1907, the CPU 102 performs the recording operation, as in Step S1407 in FIG. 14. If the paper size groups do not coincide with each other as the result of comparison, the CPU 102 determines that the maintenance recording JOB is not executable (NO in Step S1906) and the process goes to Step S1908. In Step S1908, the CPU 102 displays the paper information inconsistency error in the indicator 303, as in Step S1408 in FIG. 14, to prompt the user to exchange the paper.

According to the second embodiment described above, it is possible to prevent the recording operation of the maintenance recording JOB on wrong paper by confirming whether the paper size group on which maintenance recording job is capable of being recorded is loaded in the feeding port in the execution of the maintenance recording JOB.

Third Embodiment

A case is described in a third embodiment in which a user setting size JOB is executed.

The user setting size JOB indicates the recording JOB in which the recording operation is performed not on any of the paper templates indicated in FIG. 8 but on paper uniquely prepared by the user. The user inputs the width and the length in a direction intersecting with the width direction of the paper loaded on the feeding tray 400 to set the user setting size JOB for the printing apparatus 100. Determination of whether the user setting size JOB is executable on the loaded paper in the execution of the user setting size JOB is described in the third embodiment. A description of the same steps as in the above embodiments may be omitted herein.

Figure 20:
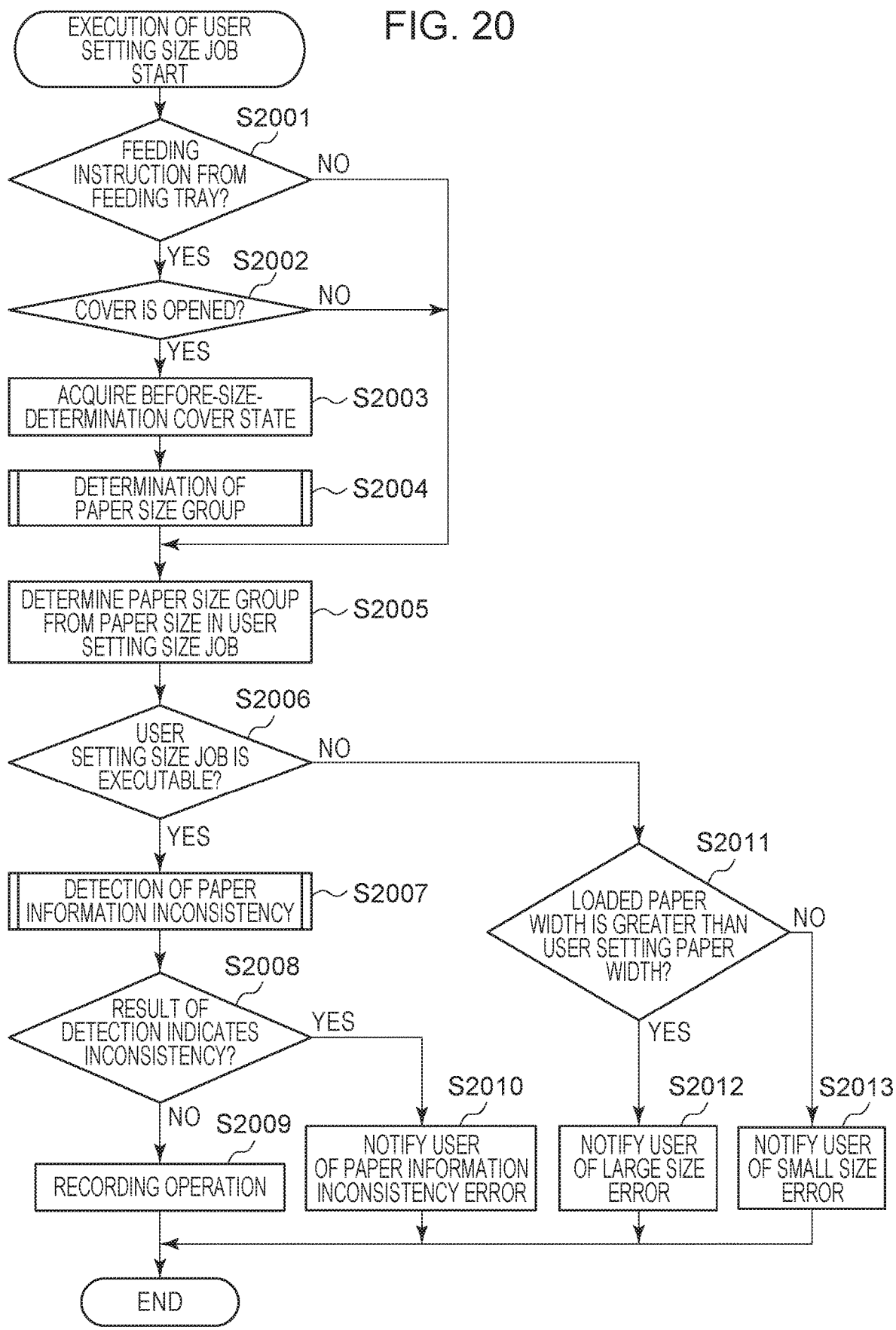
FIG. 20 is a flowchart illustrating a process in execution of a user setting size JOB in a third embodiment.

FIG. 20 is a flowchart illustrating a process performed by the CPU 102 when the user setting size JOB is executed. The process illustrated in FIG. 20 is performed by the CPU 102 in accordance with a program stored in the ROM 103. Referring to FIG. 20, the same processing as in Steps S1401 to S1404 in FIG. 14 is performed in Steps S2001 to S2004. In Step S2001, the CPU 102 determines whether an instruction to feed the paper loaded in the feeding tray 400 or the cassette 404 is issued. If an instruction to feed the paper from the cassette 404 is issued (NO in Step S2001), the process goes to Step S2005. If an instruction to feed the paper from the feeding tray 400 is issued (YES in Step S2001), in Step S2002, the CPU 102 determines the state of the cover 402. If the cover 402 is closed (NO in Step S2002), the process goes to Step S2005. If the cover 402 is opened (YES in Step S2002), in Step S2003, the CPU 102 acquires the before-size-determination cover state. The before-size-determination cover state is "the cover is opened" here. In Step S2004, the CPU 102 performs the determination of the paper size group in FIG. 11 to update the paper information stored in the ROM 103 to the information corresponding to the position of the paper guide 500.

In Step S2005, the CPU 102 determines the paper size group of the paper, which is set by the user, based on the information about the paper size included in the user setting size JOB. First, the CPU 102 acquires the paper width of the user setting size JOB specified by the user. When the acquired paper width is 170 mm, the paper belongs to Group 6 from the relational table illustrated in FIG. 8.

In Step S2006, the CPU 102 determines whether the user setting size JOB is executable. Specifically, the CPU 102 compares the paper size group acquired in Step S2005 with the paper size group in the loaded paper information in the paper information updated in the determination of the paper size group in Step S2004. If the CPU 102 determines that the instruction to feed the paper from the cassette 404 is issued in Step S2001, the CPU 102 compares the paper size group in the paper information about the paper that has been previously used in the cassette 404, which is stored in the ROM 103, with the paper size group acquired in Step S2005. If the paper size groups coincide with each other as the result of comparison, the CPU 102 determines that the user setting size JOB is executable (YES in Step S2006) and the process goes to Step S2007. The same processing as in Steps S1405 to S1408 is performed in Steps S2007 to S2010.

If the paper size groups do not coincide with each other as the result of comparison, the CPU 102 determines that the user setting size JOB is not executable (NO in Step S2006) and the process goes to Step S2011.

In Step S2011, the CPU 102 determines whether the paper size group in the loaded paper information in the paper information is greater than the paper size group of the paper set by the user, which is acquired in Step S2005. If the paper size group in the loaded paper information is greater than the paper size group of the paper set by the user (YES in Step S2011), in Step S2012, the CPU 102 makes a notification of a large size error in the indicator 303 to prompt the user to load the paper 600 having a smaller width in the feeding port. If the paper size group in the loaded paper information is smaller than the paper size group of the paper set by the user (NO in Step S2011), in Step S2013, the CPU 102 makes a notification of a small size error in the indicator 303 to prompt the user to load the paper 600 having a greater width in the feeding port. FIG. 21A illustrates a notification screen when the paper size group in the loaded paper information is greater than the paper size group of the paper set by the user. FIG. 21B illustrates a notification screen when the paper size group in the loaded paper information is smaller than the paper size group of the paper set by the user. When the user touches "Next" that is displayed, the paper exchange notification screen illustrated in FIG. 21C is displayed. Then, the process illustrated in FIG. 20 is terminated. If the cover sensor 115 subsequently detects the paper exchange, Step S2004 and the subsequent steps are performed again.

According to the third embodiment described above, it is possible to prevent the recording operation of the user setting size JOB on wrong paper by confirming whether the paper size group coinciding with that in the user setting size JOB is loaded in the feeding port in the execution of the user setting size JOB. As a result, it is possible to improve the user-friendliness.

According to the present disclosure, setting the timing when the determination of the paper size group is performed in accordance with the opening-closing state of the cover of the feeding port enables the recording operation corresponding to the result of determination of the paper size to be performed also in the state in which the cover of the feeding port is opened to improve the user-friendliness.

OTHER EMBODIMENTS

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-141565, filed on Jul. 31, 2019, which is hereby incorporated by reference herein in its entirety.

What is claimed is:

1. A recording apparatus comprising:
    a recording head configured to perform recording of an image on a recording medium based on a recording instruction;
    a loading unit configured to be loaded with the recording medium;
    a feeding unit configured to feed the recording medium loaded on the loading unit to a position where the recording head is capable of performing the recording;
    a cover configured to be movable between an opening state in which a feeding port for loading the recording medium on the loading unit is opened and a closing state in which at least part of the feeding port is covered;
    an opening-closing detection unit configured to detect an opening-closing state of the cover; and
    a determination unit configured to determine a size of the recording medium loaded on the loading unit based on a result of detection by a width detection operation configured to detect a width of the recording medium loaded on the loading unit,
    wherein the recording by the recording head is performed in accordance with a result of determination by the determination unit,
    wherein, if the opening-closing detection unit detects the closing of the cover before the recording is performed, the determination unit performs the width detection operation to determine the recording medium size loaded on the loading unit, and wherein, if the opening-closing detection unit detects the opening of the cover and the recording apparatus receives the recording instruction, the determination unit performs the width detection operation to determine the recording medium size loaded on the loading unit.

2. The recording apparatus according to claim 1, wherein the determination unit further determines a type of the recording medium based on the result of detection.

3. The recording apparatus according to claim 1, wherein the determination unit determines the recording medium size loaded on the loading unit in response to a turning on of a power of the recording apparatus.

4. The recording apparatus according to claim 1,
wherein the opening-closing detection unit also detects whether the cover is closed while a power of the recording apparatus is turned off, and
wherein, if the opening-closing detection unit detects that the cover is opened while the power of the recording apparatus is turned off, the determination unit determines the recording medium size loaded on the loading unit in response to a turning on of the power of the recording apparatus.

5. The recording apparatus according to claim 1, further comprising a guide configured to abut against the recording medium loaded in the loading unit in a direction intersecting with a direction of the feeding to suppress movement of the recording medium in the intersecting direction,
wherein the width detection operation is performed by detecting a position of the guide to detect a position of an end portion of the recording medium.

6. The recording apparatus according to claim 1, further comprising a storage unit configured to store information about types of recording medium of a plurality of sizes, which are capable of being loaded on the loading unit,
wherein the information is stored in a plurality of groups corresponding to the plurality of sizes of the recording medium, and
wherein the determination unit determines a group based on the result of detection.

7. The recording apparatus according to claim 6, wherein the storage unit stores information about the recording medium size which is set by a user.

8. The recording apparatus according to claim 6, further comprising:
a notification control unit configured to cause a notification unit to indicate information indicating the types of recording medium belonging to the group determined by the determination unit; and
a setting unit configured to set a type of recording medium indicated by information that is input as the type of recording medium loaded on the loading unit and to set a size of the recording medium.

9. The recording apparatus according to claim 8, wherein the notification control unit causes the notification unit to indicate the recording medium size belonging to the group determined by the determination unit.

10. The recording apparatus according to claim 9, wherein the notification control unit further causes the notification unit to indicate the type of recording medium corresponding to the recording medium size belonging to the group.

11. The recording apparatus according to claim 8,
wherein the storage unit stores history information, which is information about the type of recording medium that has been used last, for each group, and
wherein the notification control unit causes the notification unit to indicate the information about the type of recording medium that has been used last in the group determined by the determination unit, as the type of recording medium loaded on the loading unit based on the history information and the group determined by the determination unit.

12. The recording apparatus according to claim 11, wherein, if no information is input for a predetermined time since the notification control unit causes the notification unit to indicate information indicating a type of recording medium, the setting unit sets the indicated type of recording medium as the type of recording medium loaded on the loading unit.

13. The recording apparatus according to claim 8, further comprising an image processing unit configured to perform image processing,
wherein the recording instruction is issued by acquiring data for a recording operation by the image processing unit,
wherein the data includes image data to be recorded on the recording medium and information about the recording medium size,
wherein, if the size indicated by the information about the recording medium size, which is included in the data, coincides with the recording medium size set by the setting unit, the recording operation is started, and
wherein, if the size indicated by the information about the recording medium size, which is included in the data, does not coincide with the recording medium size set by the setting unit, the notification control unit causes the notification unit to indicate that the size indicated by the information about the recording medium size, which is included in the data, does not coincide with the recording medium size set by the setting unit.

14. The recording apparatus according to claim 8,
wherein the storage unit stores information about the recording medium size on which an image to be recorded for maintenance of the recording head is recordable,
wherein, if the recording medium size for maintenance coincides with the recording medium size determined by the determination unit, a recording operation of the image for maintenance is started, and
wherein, if the recording medium size for maintenance does not coincide with the recording medium size determined by the determination unit, the notification control unit causes the notification unit to indicate that the recording medium size for maintenance does not coincide with the recording medium size determined by the determination unit.

15. A method for a recording apparatus having a loading unit and a cover configured to be movable between an opening state in which a feeding port for loading a recording medium on the loading unit is opened and a closing state in which at least part of the feeding port is covered, the method comprising:
performing recording of an image on a recording medium based on a recording instruction;
loading the loading unit with the recording medium;
feeding the recording medium loaded on the loading unit to a position where a recording head is capable of performing the recording;
detecting an opening-closing state of the cover; and
determining a size of the recording medium loaded on the loading unit based on a result of detection by a width detection operation configured to detect a width of the recording medium loaded on the loading unit, wherein performing recording includes performing recording in accordance with a result of determining the size of the recording medium, wherein, if the closing of the cover is detected before the recording is performed, determining includes performing the width detection operation to determine the recording medium size loaded on the loading unit, and wherein, if the opening of the cover is detected and the recording apparatus receives the recording instruction, determining includes performing the width detection operation to determine the recording medium size loaded on the loading unit.

16. The method according to claim 15, wherein determining further includes determining a type of the recording medium based on the result of detection.

17. The method according to claim 15, further comprising storing information about types of recording medium of a plurality of sizes, which are capable of being loaded on the loading unit, wherein the information is stored in a plurality of groups corresponding to the plurality of sizes of the recording medium, wherein determining includes determining a group based on the result of detection.

18. The method according to claim 17, further comprising:

indicating information indicating the types of recording medium belonging to the determined group; and setting a type of recording medium indicated by information that is input as the type of recording medium loaded on the loading unit and setting a size of the recording medium.

19. The method according to claim 18, wherein storing includes storing history information, which is information about the type of recording medium that has been used last, for each group, and wherein indicating includes indicating the information about the type of recording medium that has been used last in the determined group, as the type of recording medium loaded on the loading unit based on the history information and the determined group.

20. The method according to claim 18, wherein storing includes storing information about the recording medium size on which an image to be recorded for maintenance of the recording head is recordable, wherein, if the recording medium size for maintenance coincides with the determined recording medium size, a recording operation of the image for maintenance is started, and wherein, if the recording medium size for maintenance does not coincide with the determined recording medium size, indicating includes indicating that the recording medium size for maintenance does not coincide with the determined recording medium size.

21. A non-transitory computer-readable storage medium storing a program to cause a computer to perform a method for a recording apparatus having a loading unit and a cover configured to be movable between an opening state in which a feeding port for loading the recording medium on the loading unit is opened and a closing state in which at least part of the feeding port is covered, the method comprising:

performing recording of an image on a recording medium based on a recording instruction;

loading the loading unit with the recording medium;

feeding the recording medium loaded on the loading unit to a position where a recording head is capable of performing the recording;

detecting an opening-closing state of the cover; and determining a size of the recording medium loaded on the loading unit based on a result of detection by a width detection operation configured to detect a width of the recording medium loaded on the loading unit, wherein performing recording includes performing recording in accordance with a result of determining the size of the recording medium, wherein, if the closing of the cover is detected before the recording is performed, determining includes performing the width detection operation to determine the recording medium size loaded on the loading unit, and wherein, if the opening of the cover is detected and the recording apparatus receives the recording instruction, determining includes performing the width detection operation to determine the recording medium size loaded on the loading unit.

* * * * *